(12) United States Patent
Shibayama et al.

(10) Patent No.: US 11,762,729 B2
(45) Date of Patent: Sep. 19, 2023

(54) APPARATUS AND METHOD FOR ANOMALY COUNTERMEASURE DECISION, EXECUTION AND EVALUATION

(71) Applicant: Hitachi, Ltd., Tokyo (JP)

(72) Inventors: Tsukasa Shibayama, Tokyo (JP); Akira Deguchi, Tokyo (JP)

(73) Assignee: HITACHI, LTD., Tokyo (JP)

( * ) Notice: Subject to any disclaimer, the term of this patent is extended or adjusted under 35 U.S.C. 154(b) by 77 days.

(21) Appl. No.: 17/475,609

(22) Filed: Sep. 15, 2021

(65) Prior Publication Data

US 2022/0121513 A1 Apr. 21, 2022

(30) Foreign Application Priority Data

Oct. 19, 2020 (JP) .................. 2020-175340

(51) Int. Cl.
*G06F 11/07* (2006.01)
(52) U.S. Cl.
CPC ...... *G06F 11/0793* (2013.01); *G06F 11/0727* (2013.01)
(58) Field of Classification Search
CPC ............. G06F 11/0727; G06F 11/0751; G06F 11/079; G06F 11/0793
See application file for complete search history.

(56) References Cited

U.S. PATENT DOCUMENTS

| 7,016,808 | B2 * | 3/2006 | Obert ................. G06F 11/0748 702/184 |
| 10,303,538 | B2 * | 5/2019 | Thomas ................. G06Q 10/06 |
| 11,099,928 | B1 * | 8/2021 | Vah ........................ G06N 3/044 |
| 2014/0068343 | A1 | 3/2014 | Nakajima et al. |

* cited by examiner

*Primary Examiner* — Joseph R Kudirka
(74) *Attorney, Agent, or Firm* — Baker Botts L.L.P.

(57) ABSTRACT

A computer management apparatus including a plurality of nodes, each including a processor and a storage device, and stores a countermeasure result table including a plurality of combinations of an anomaly detection rule, a countermeasure rule which is a countermeasure against an anomaly, and an effect indicating effectiveness of these rules, and the management apparatus includes: an anomaly detection unit that detects an anomaly of the computer system based on information acquired from the computer system and the anomaly detection rule; an execution unit that decides a countermeasure, at which the anomaly has been detected by the anomaly detection unit, on the basis of the detected anomaly, the countermeasure rule, and the effect indicating the effectiveness, and executes the decided countermeasure; and a countermeasure result information setting unit that evaluates a result of the countermeasure and records the result in the effect indicating the effectiveness in the countermeasure result table.

9 Claims, 23 Drawing Sheets

FIG. 8

| APPARATUS ID | RESOURCE TYPE | RESOURCE ID | RELATED RESOURCES | SPEC |
|---|---|---|---|---|
| APPARATUS 1 | CPU | CPU1 | - | 4.0GHz |
| | | CPU2 | - | 4.0GHz |
| | | ... | | |
| | CACHE | Cache1 | - | 128GB |
| | | Cache2 | - | 128GB |
| | | ... | | |
| | NIC | Port1 | - | 100GB/sec |
| | | Port2 | - | 100GB/sec |
| | | ... | | |
| | DRIVE | Drive1 | Pool1 | 1TB MLC |
| | | Drive2 | Pool1 | 1TB MLC |
| | | ... | | |
| | POOL | Pool1 | - | 1.5TB |
| | | Pool2 | - | 15TB |
| | | ... | | |
| | VOLUME | Volume1 | Pool1 | 1TB |
| | | Volume2 | Pool2 | 5TB |
| | | Volume3 | APPARATUS 2, VOLUME 1 | 5TB |
| | | ... | | |
| APPARATUS 2 | ... | | | |
| ... | | | | |

| APPARATUS ID | RESOURCE TYPE | RESOURCE ID | METRIC | TIME OF DAY | AMOUNT |
|---|---|---|---|---|---|
| APPARATUS 1 | CPU | CPU1 | CPU UTILIZATION RATE | 10:00:00 | 30% |
| | | | | 10:00:05 | 20% |
| | | | | ... | |
| | | ... | | | |
| | CACHE | Cache1 | CACHE UTILIZATION RATE | 10:00:00 | 30% |
| | | | | ... | |
| | | ... | | | |
| | NIC | Port1 | PORT I/O COUNT | 10:00:00 | 500 |
| | | | | ... | |
| | | ... | | | |
| | DRIVE | Drive1 | DRIVE OPERATION RATE | 10:00:00 | 30% |
| | | | | ... | |
| | | ... | | | |
| | POOL | Pool1 | POOL UNIT I/O | 10:00:00 | 1000 |
| | | | | ... | |
| | | ... | | | |
| | VOLUME | Volume1 | READ I/O COUNT | 10:00:00 | 100 |
| | | | | 10:00:05 | 110 |
| | | | | ... | |
| | | | WRITE I/O COUNT | 10:00:00 | 50 |
| | | | | 10:00:05 | 50 |
| | | | | ... | |
| | | ... | | | |
| APPARATUS 2 | ... | | | | |
| ... | | | | | |

| ID 1001 | ANOMALY LOCATION 1002 | ANOMALY DETECTION RULE 1003 | COUNTERMEASURE RULE 1004 | LABEL 1005 | CUSTOMER ID 1006 | APPARATUS ID 1007 | CONFIGURATION 1008 | EFFECT 1009 |
|---|---|---|---|---|---|---|---|---|
| 1 | CPU | CPU OPERATION RATE IN EXCESS OF 40% | CPU LOAD REBALANCE | HW/SW HAVING IN COMMON | - | - | - | EFFECTIVE |
| 2 | DRIVE | DRIVE OPERATION RATE IN EXCESS OF 40% | ADD DRIVE | HW/SW HAVING IN COMMON | - | - | - | EFFECTIVE |
| 3 | MEMORY | MEMORY USAGE AMOUNT IN EXCESS OF 30% | I/O CAPPING | HW/SW HAVING IN COMMON | - | - | - | EFFECTIVE |
| 4 | PORT | PORT LOAD IN EXCESS OF 40% | I/O CAPPING | ENVIRONMENT-SPECIFIC | A | APPARATUS 1 | - | EFFECTIVE |
| 5 | PORT | PORT LOAD IN EXCESS OF 40% | PATH SWITCHING | ENVIRONMENT-SPECIFIC | A | APPARATUS 1 | WITH DR | INEFFECTIVE |
| 6 | CPU | DIFFERENCE IN CPU OPERATION RATE FROM PREVIOUS DAY IS 20% | CPU LOAD REBALANCE | ENVIRONMENT-SPECIFIC | B | APPARATUS 2 | WITHOUT DR | EFFECTIVE |
| ⋮ | | | | | | | | |

| | 1401 | 1402 | 1403 |
|---|---|---|---|
| | APPARATUS TYPE | RESOURCE | ASSUMED CAUSE |
| | APPARATUS A | CPU | LOAD UNBALANCE |
| | | | RAPID INCREASE IN HOST I/O |
| | | | ERRONEOUS MANAGEMENT OPERATION (OPERATION A) |
| | | | FAILURE OCCURRENCE |
| | | | ... |
| | | CACHE | LOAD UNBALANCE |
| | | | RAPID INCREASE IN HOST I/O |
| | | | ... |
| | | NIC | LOAD UNBALANCE |
| | | | RAPID INCREASE IN HOST I/O |
| | | | ... |
| | | DRIVE | RAPID INCREASE IN HOST I/O |
| | | | ERRONEOUS MANAGEMENT OPERATION (OPERATION A) |
| | | | ... |
| | | POOL | RAPID INCREASE IN HOST I/O |
| | | | ERRONEOUS MANAGEMENT OPERATION (OPERATION A) |
| | | | ... |
| | | VOLUME | RAPID INCREASE IN HOST I/O |
| | | | ERRONEOUS MANAGEMENT OPERATION (OPERATION A) |
| | | | ... |
| | APPARATUS B | ... | |
| | ... | | |

FIG. 17

| APPARATUS TYPE (1501) | ASSUMED CAUSE (1502) | PROPOSED COUNTERMEASURE CANDIDATE (1503) |
|---|---|---|
| APPARATUS A | LOAD UNBALANCE | LOAD REBALANCE |
| | | I/O CAPPING |
| | | ADD NODE |
| | | CHANGE SCHEDULE OF PROCESSING INSIDE STORAGE APPARATUS |
| | RAPID INCREASE IN HOST I/O | NO PROPOSED COUNTERMEASURE (STORAGE CANNOT DEAL WITH ANOMALY AND APPLICATION NEEDS TO DEAL WITH IT) |
| | ERRONEOUS MANAGEMENT OPERATION (OPERATION A) | ... |
| | ERRONEOUS MANAGEMENT OPERATION (OPERATION B) | ... |
| | ... | ... |
| APPARATUS B | | |
| ... | | |

| APPARATUS ID (1601) | TIME OF DAY (1602) | LOG TYPE (1603) | RESOURCE ID (1604) | EVENT (1605) |
|---|---|---|---|---|
| APPARATUS 1 | 10:00:00 | FAILURE | Drive1 | BREAKDOWN |
| | 10:00:05 | OPERATION | Volume1 | COPY INITIALIZATION: START |
| | 10:10:00 | OPERATION | Volume1 | COPY INITIALIZATION: NORMAL END |
| | ... | ... | | |
| APPARATUS 2 | | | | |
| ... | | | | |

| 1701 CUSTOMER ID | 1702 APPARATUS ID | 1703 APPARATUS TYPE | 1704 SETTING TYPE | 1705 RESOURCE TYPE | 1706 RESOURCE ID | 1707 PROCESSING CONTENT | 1708 SCHEDULE |
|---|---|---|---|---|---|---|---|
| CUSTOMER A | APPARATUS 1 | APPARATUS A | SYSTEM SETTING | ENTIRE ARRAY | - | MIGRATE LOW-FREQUENCY ACCESS DATA TO LOW HIERARCHICAL LEVEL | CHECK ONCE A WEEK |
| | | | CUSTOMER OPERATION | VOLUME | Volume3 | CREATE FULL BACKUP | AT 2:00 EVERY DAY |
| | | | | | Volume4 | CREATE DIFFERENCE BACKUP | AT 1:00 EVERYDAY |
| | | | ... | ... | ... | ... | ... |
| | APPARATUS 2 | APPARATUS A | SYSTEM SETTING | ENTIRE ARRAY | - | MIGRATE LOW-FREQUENCY ACCESS DATA TO LOW HIERARCHICAL LEVEL | CHECK ONCE A WEEK |
| | | | CUSTOMER OPERATION | VOLUME | Volume3 | CREATE FULL BACKUP | AT 2:00 EVERY DAY |
| | | | | | Volume4 | CREATE DIFFERENCE BACKUP | AT 1:00 EVERY DAY |
| | APPARATUS 3 | APPARATUS B | | | | | |
| CUSTOMER B | APPARATUS 4 | APPARATUS C | | | | | |
| ... | | | | | | | |

FIG. 22

| ID | ANOMALY LOCATION | ANOMALY DETECTION RULE | REFERENCE VALUE | VARIABLE CONDITION | COUNTER-MEASURE RULE | LABEL | CUSTOMER ID | APPARATUS ID | CONFIG-URATION | EFFECT |
|---|---|---|---|---|---|---|---|---|---|---|
| 1 | CPU | CPU OPERATION RATE IN EXCESS OF REFERENCE | 40% | INCREASE INCLINATION IN THE LAST 10 MINUTES IS 5 OR LESS → REFERENCE + 5% | CPU LOAD REBALANCE | HW/SW HAVING IN COMMON | - | - | - | EFFECTIVE |
| 2 | DRIVE | DRIVE OPERATION RATE IN EXCESS OF REFERENCE | 40% | ADD THE NUMBER OF VOLUMES/POOL CAPACITY [QUANTITY/GB] AS REFERENCE VALUE | ADD DRIVE | HW/SW HAVING IN COMMON | - | - | - | EFFECTIVE |
| 3 | MEMORY | MEMORY USAGE AMOUNT IN EXCESS OF REFERENCE | 30% | ADD THE NUMBER OF VOLUMES/MEMORY CAPACITY[QUANTITY/GB] TO THE PREFERENCE VALUE | I/O CAPPING | HW/SW HAVING IN COMMON | - | - | - | EFFECTIVE |
| 4 | PORT | PORT LOAD IN EXCESS OF REFERENCE | 40% | DEAL WITH ANOMALY WITH THE NUMBER OF PORT USING VOLUMES EQUAL TO OR LESS THAN 100 | I/O CAPPING | ENVIRONMENT-SPECIFIC | A | APPARATUS 1 | WITH DR | EFFECTIVE |
| 5 | PORT | PORT LOAD IN EXCESS OF REFERENCE | 40% | DEAL WITH ANOMALY WITH THE NUMBER OF PORT USING VOLUMES MORE THAN 100 | PATH SWITCHING | ENVIRONMENT-SPECIFIC | A | APPARATUS 1 | WITHOUT DR | INEFFECTIVE |
| 6 | CPU | THERE IS DIFFERENCE IN CPU OPERATION RATE FROM PREVIOUS DAY | 20% | - | CPU LOAD REBALANCE | ENVIRONMENT-SPECIFIC | B | APPARATUS 2 | WITHOUT DR | EFFECTIVE |
| ⋮ | | | | | | | | | | |

APPARATUS AND METHOD FOR ANOMALY COUNTERMEASURE DECISION, EXECUTION AND EVALUATION

TECHNICAL FIELD

The present invention relates to a management apparatus and a management method.

BACKGROUND ART

In recent years, operational management operations have been increasingly automated to reduce operation costs of computer systems, etc. and a technology that upgrades and facilitates the operational management by collecting and analyzing operation information of storage apparatuses has become widespread. For example, PTL 1 discloses a technology that employs a bottom cause analysis technology upon the occurrence of problems, creates expansion rule information from general purpose rule information, predicts effects of countermeasure methods described in the expansion rule information, and proposes a plurality of proposed countermeasures.

CITATION LIST

Patent Literature

PTL 1: U.S. Unexamined Patent Application Publication No. 2014/0068343

SUMMARY OF THE INVENTION

Problems to be Solved by the Invention

Regarding the invention described in PTL 1, proposed countermeasure candidates are fixed with respect to failures described in general purpose rules and expansion rules, so that any proposed countermeasures to be suggested cannot be added during the operation.

Means to Solve the Problems

A management apparatus according to a first aspect of the present invention is a management apparatus for managing a computer system including a plurality of nodes, each of which includes a processor and a storage device, wherein the management apparatus stores a countermeasure result table including a plurality of combinations of an anomaly detection rule which is a reference for detecting an anomaly, a countermeasure rule which is a countermeasure against the anomaly, and an effect indicating effectiveness of these rules, and the management apparatus includes: an anomaly detection unit that detects an anomaly of the computer system on the basis of operation information acquired from the computer system and the anomaly detection rule; an execution unit that decides a countermeasure for the computer system, at which the anomaly has been detected by the anomaly detection unit, on the basis of the detected anomaly, the countermeasure rule, and the effect indicating the effectiveness, and executes the decided countermeasure; and a countermeasure result information setting unit that evaluates a result of the countermeasure executed by the execution unit and records the result in the effect indicating the effectiveness in the countermeasure result table.

A management method according to a second aspect of the present invention is a management method executed by a management apparatus for managing a computer system including a plurality of nodes, each of which includes a processor and a storage device, wherein the management apparatus includes a storage unit that stores a countermeasure result table including a plurality of combinations of an anomaly detection rule which is a reference for detecting an anomaly, a countermeasure rule which is a countermeasure against the anomaly, and an effect indicating effectiveness of these rules, and the management method includes: detecting an anomaly of the computer system on the basis of operation information acquired from the computer system and the anomaly detection rule; deciding a countermeasure for the computer system, at which the anomaly has been detected, on the basis of the detected anomaly, the countermeasure rule, and the effect indicating the effectiveness, and executing the decided countermeasure; and evaluating a result of the executed countermeasure and recording the result in the effect indicating the effectiveness in the countermeasure result table.

Advantageous Effects of the Invention

A new proposed countermeasure(s) can be added during the operation according to the present invention.

BRIEF DESCRIPTION OF DRAWINGS

FIG. 8 is a diagram illustrating an example of a configuration information table;

FIG. 9 is a diagram illustrating an example of an operation information table;

FIG. 10 is a diagram illustrating an example of a countermeasure result table;

FIG. 16 is a diagram illustrating an example of an assumed cause correspondence relationship table;

FIG. 17 is a diagram illustrating an example of a proposed countermeasure correspondence relationship table;

FIG. 18 is a diagram illustrating a storage operation log;

FIG. 19 is a diagram illustrating a storage processing schedule;

FIG. 22 is a diagram illustrating an example of countermeasure results according to the third embodiment.

DESCRIPTION OF EMBODIMENTS

Figure 1:
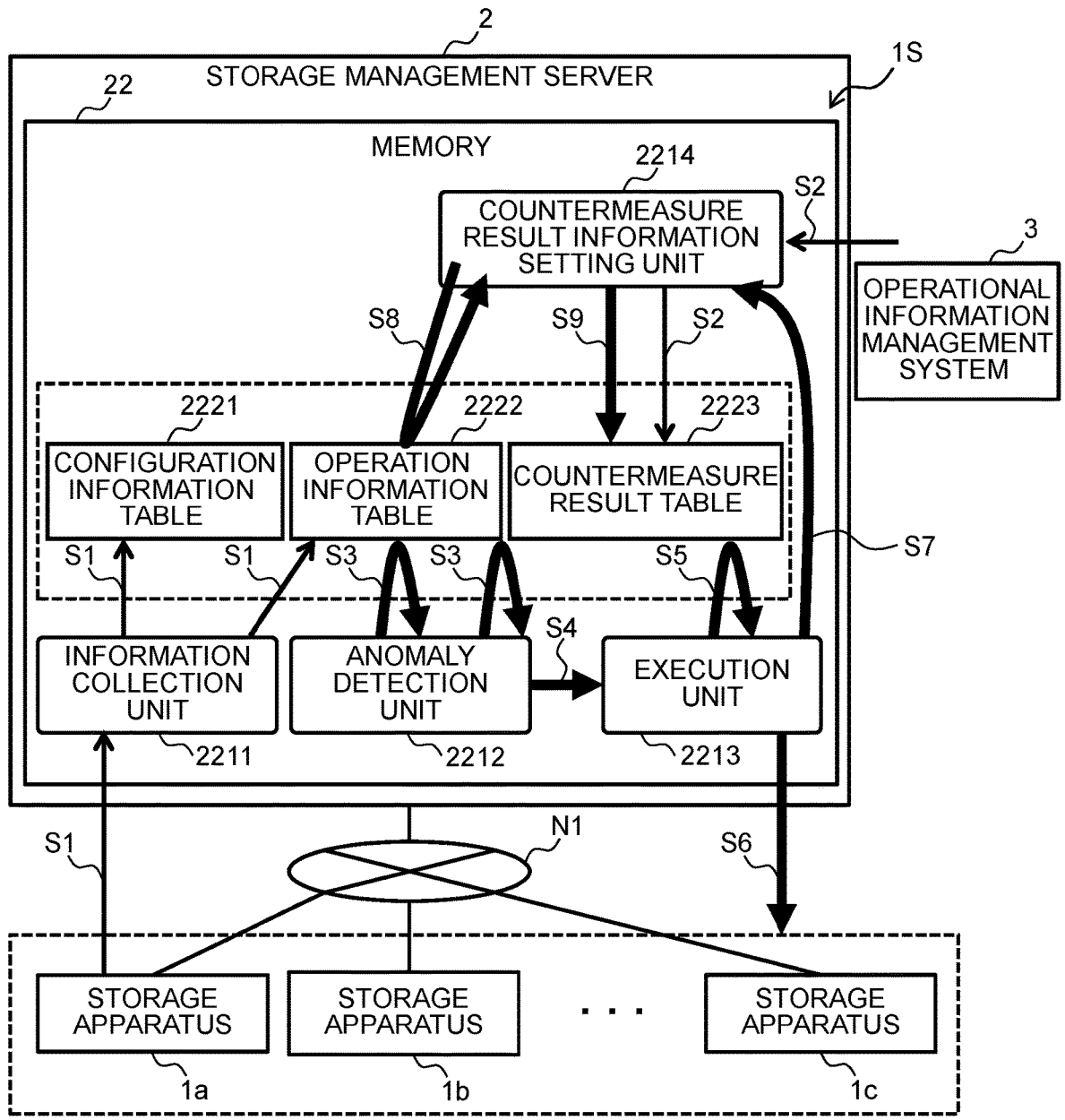
FIG. 1 is an explanatory diagram of the outline of a first embodiment.

Preferred embodiments of the present invention will be explained below. In the following explanation, any redundant explanation will be omitted by assigning the same reference numeral to the same or similar elements and processing and explaining the difference(s) between them. Also, in embodiments described later, any redundant explanation will be omitted by explaining the difference(s) from an embodiment(s) which has already been explained.

Furthermore, configurations and processing illustrated in the following explanation and the respective drawings show examples of the outlines of embodiments to the degree required to understand and implement the present invention and it is not the gist or the intention to limit the embodiments according to the present invention. Furthermore, a part or whole of each embodiment and each variation can be combined with each other without departing from the gist of the present invention and within the matching range.

In the following explanation, similar elements to which reference numerals distinguished by additional characters or branch numbers added to numbers are assigned will be collectively referred to by using the reference numerals composed of only the numbers, regardless of the additional characters or the branch numbers. For example, elements to which reference numerals such as "100a" and "100b" or "200-1" and "200-2" will be collectively referred to by assigning the reference numerals such as "100" or "200." Moreover, similar elements to which reference numerals formed by adding additional characters or branch numbers to numbers are assigned, such as an "XX interface 94a" and a "YY interface 94b," will be collectively referred to as, for example, the "interface 94," by using the reference numeral part which is composed of only the common part that is the name of the relevant element, and the relevant number.

Furthermore, in the following explanation, various types of information will be explained by using a table format; however, the information is not limited to the table format and other formats such as a document format may be used. Also, the table structure is merely one example and tables can be integrated and distributed as appropriate. Moreover, in the following explanation, either numbers or a character string may be used as an ID or a name indicated as a column of each table as long as records can be distinguished one from another.

Furthermore, in the following explanation, processing may be sometimes explained by referring to a "program" as a subject. Since the program is executed by a processor (for example, a CPU [Central Processing Unit]) and thereby performs defined processing by using, for example, storage resources (such as a memory) and/or communication interface devices (such as communication ports) as appropriate, the processor may be referred to as the subject of the processing. The processing explained by referring to a program as its subject may be considered as processing executed by a processor or an apparatus including that processor.

Furthermore, the processor which executes a program may be also referred to as an "XX unit" as an apparatus for implementing an intended processing function. Furthermore, the processor may include a hardware circuit which executes a part or whole of the processing. Programs may be installed from a program source to each controller. The program source may be, for example, a program distribution computer or a computer-readable storage medium.

First Embodiment

A first embodiment of a storage management server which is a management apparatus will be explained below with reference to FIG. 1 to FIG. 14.

Outline of First Embodiment

FIG. 1 is an explanatory diagram of the outline of a first embodiment. A computer system 1S illustrated in FIG. 1 includes a plurality of storage apparatuses 1a, 1b, 1c, a storage management server 2, and an operational information management system 3. The storage management server 2 includes a memory 22. This memory 22 stores an information collection unit 2211, an anomaly detection unit 2212, an execution unit 2213, a countermeasure result information setting unit 2214, a configuration information table 2221, an operation information table 2222, and a countermeasure result table 2223. The storage apparatuses 1a, 1b, 1c are coupled to the storage management server 2 via a network N1.

The outlines of operations of the computer system 1S are as described in steps S1 to S9 explained below. The first step S1 is processing for acquiring the configuration information and the operation information. The information collection unit 2211 regularly executes the processing of step S1. In step S1, the information collection unit 2211 collects the configuration information and the operation information from the storage apparatuses 1a, 1b, 1c and saves the collected configuration information and operation information in the configuration information table 2221 and the operation information table 2222, respectively.

Step S2 is processing for acquiring the operational information. The countermeasure result information setting unit 2214 regularly executes the processing of step S2. In step S2, the countermeasure result information setting unit 2214 collects the operational information from the operational information management system 3; and if the collected operational information includes information which retains a rule(s) that does not correspond to the existing countermeasure results, it saves that information in the countermeasure result table 2223. Incidentally, the setting of the operational information to the countermeasure result information setting unit 2214 does not necessarily have to be collected from the operational information management system 3 and, for example, an administrator may set the information to the countermeasure result information setting unit 2214.

Steps S3 to S9 are processing for setting countermeasure result information Z on the basis of the execution results of the anomaly detection unit 2212 and the execution unit 2213. In step S3, the anomaly detection unit 2212 regularly judges whether or not the state of satisfying the anomaly detection rule 1003 in the countermeasure result table 2223 is included in the operation information table 2222, by referring to the operation information table 2222 and the countermeasure result table 2223. If the anomaly detection unit 2212 determines that if the state of satisfying the anomaly detection rule 1003 is included in the operation information table 2222, it notifies the execution unit 2213 to that effect in step S4. If the anomaly detection unit 2212 determines that the state of satisfying the anomaly detection rule 1003 is not included in the operation information table 2222, it does not execute any particular processing.

In step S5, the execution unit 2213 carries out a simulation after narrowing down countermeasure methods by using label information with reference to the countermeasure result table 2223, performs scoring, and decides a necessary countermeasure method. In step S6, the execution unit 2213 executes processing on the storage apparatus. In step S7, the execution unit 2213 notifies the countermeasure result information setting unit 2214 of the execution of the countermeasure. In step S8, after the elapse of a certain period of time after the execution result, the countermeasure result information setting unit 2214 acquires the information from the operation information table 2222 and evaluates the result. This evaluation is conducted by the execution unit 2213 to evaluate whether the effect of the processing executed in step S6 is effective or not. In step S9, the countermeasure result information setting unit 2214 sets the evaluation in step S8 to the countermeasure result table 2223, notifies the execution unit 2213 of the evaluation as necessary, and repeats the processing from step S5.

Through the above-described processing, the computer system 1S enhances the proposed countermeasure candidates during the operation. Furthermore, if the computer system 1S proposes and executes a proposed countermeasure, it takes into consideration the storage apparatuses and a processing load to devise the proposed countermeasures, decides and executes the countermeasure method with a small processing amount, and thereby realizes automation of the operational management of target apparatuses.

Overall Configuration of Computer System 1S

Figure 2:
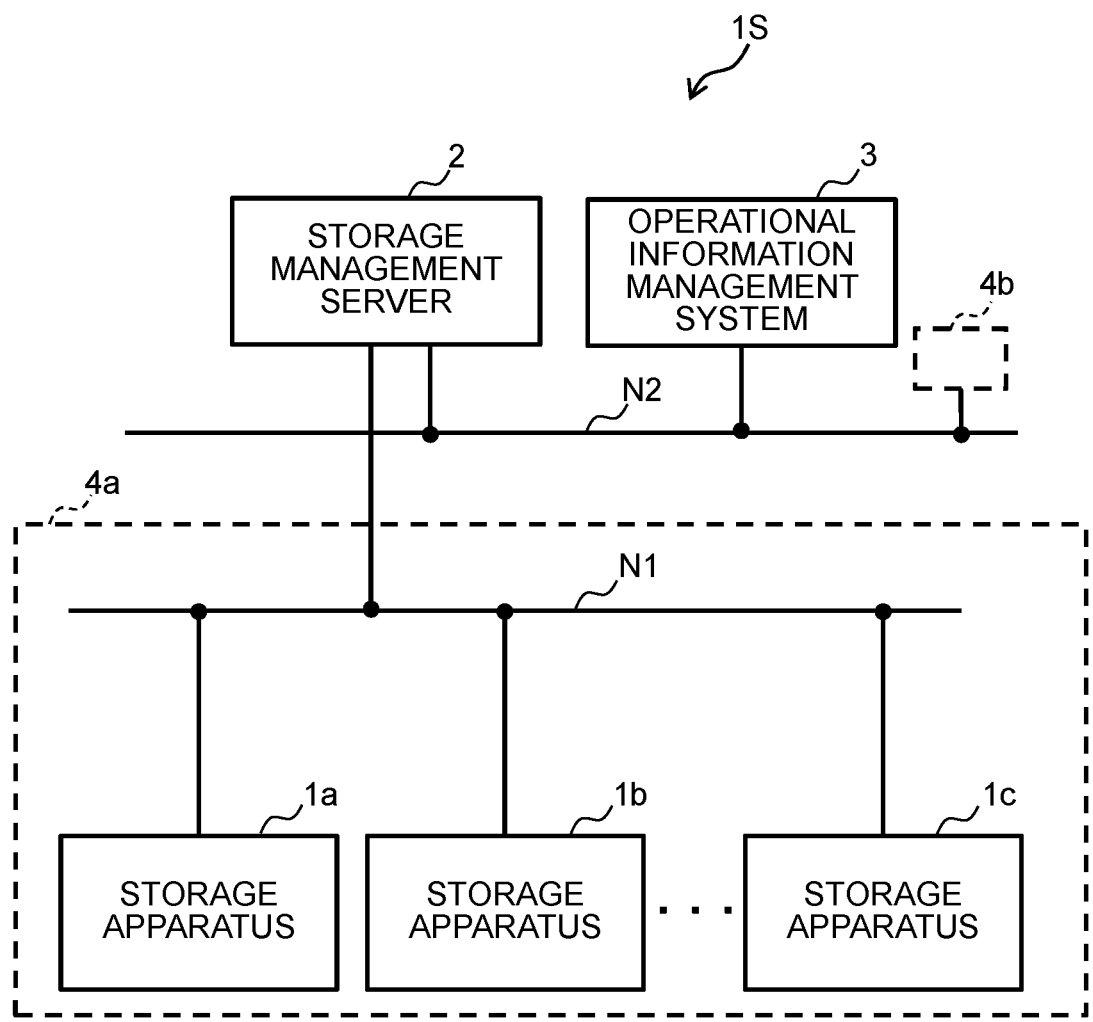
FIG. 2 is a diagram illustrating an overall configuration of a computer system.

FIG. 2 is a diagram illustrating an overall configuration of the computer system 1S. The computer system 1S includes the storage apparatuses 1a, 1b, 1c, the storage management server 2, the operational information management system 3, and data centers 4a, 4b. The data center 4a includes the storage apparatuses 1a, 1b, 1c. However, the configuration of the data center 4a including a plurality of storage apparatuses is not a requisite configuration, and the data center 4a may include one or more storage apparatuses. The data center 4b also includes one or more storage apparatus. It should be noted that the storage apparatuses 1a, 1b, 1c may be hereinafter sometimes collectively referred to as the "storage apparatus(es) 1." Since the storage management server 2 manages the storage apparatuses 1, it can be also called a "management apparatus." Furthermore, since the data center 4a includes a plurality of computers, it can also be hereinafter called a "computer system."

In the computer system 1S, the storage apparatuses 1a, 1b, 1c and the storage management server 2 are coupled to each other via the network N1 in the data center. The storage management server 2 and the operational information management system 3 are coupled to each other via a network N2 outside the data center. The network N1 inside the data center and the network N2 outside the data center may be the same network. Incidentally, these networks may be set as being redundant. Also, these networks can use various wired and wireless communication standards. The communication standards are, for example, IEEE802.3, InfiniBand, and IEEE802.11.

The storage management server 2 retains management information of the storage apparatuses 1a, 1b, 1c and operates the storage apparatuses 1a, 1b, 1c. For example, the storage management server 2 collects the information from the storage apparatuses 1a, 1b, 1c via a program and displays the management information and displays the management information via a GUI to the administrator. Furthermore, the storage management server 2 transmits an operation request, which is input by the administrator, to the storage apparatuses 1a, 1b, 1c and has them execute the operation request.

The operational information management system 3 is a system for managing actual results of the operational management information at one or more data centers 4a, 4b. The operational management information at the one or more data centers 4a, 4b may be collected to expand the information or inquiry information between storage apparatus users and a storage apparatus provider may be managed and set by a human(s). In the latter case, the operational information in the operational information management system 3 is updated via, for example, the GUI.

Incidentally, the storage management server 2 collectively manages the storage apparatuses 1a, 1b, 1c of all the data centers 4a, 4b; however, the storage management server 2 may be configured so that it exists in each data center 4a, 4b and manages the storage apparatuses of each data center. The operational information management system 3 may be included in any one of the data centers. Moreover, the storage management server 2 and the operational information management system 3 may be implemented by the same hardware. Furthermore, part of the processing executed by the operational information management system 3 may be executed by the administrator.

Configuration of Storage Apparatus 1

Figure 3:
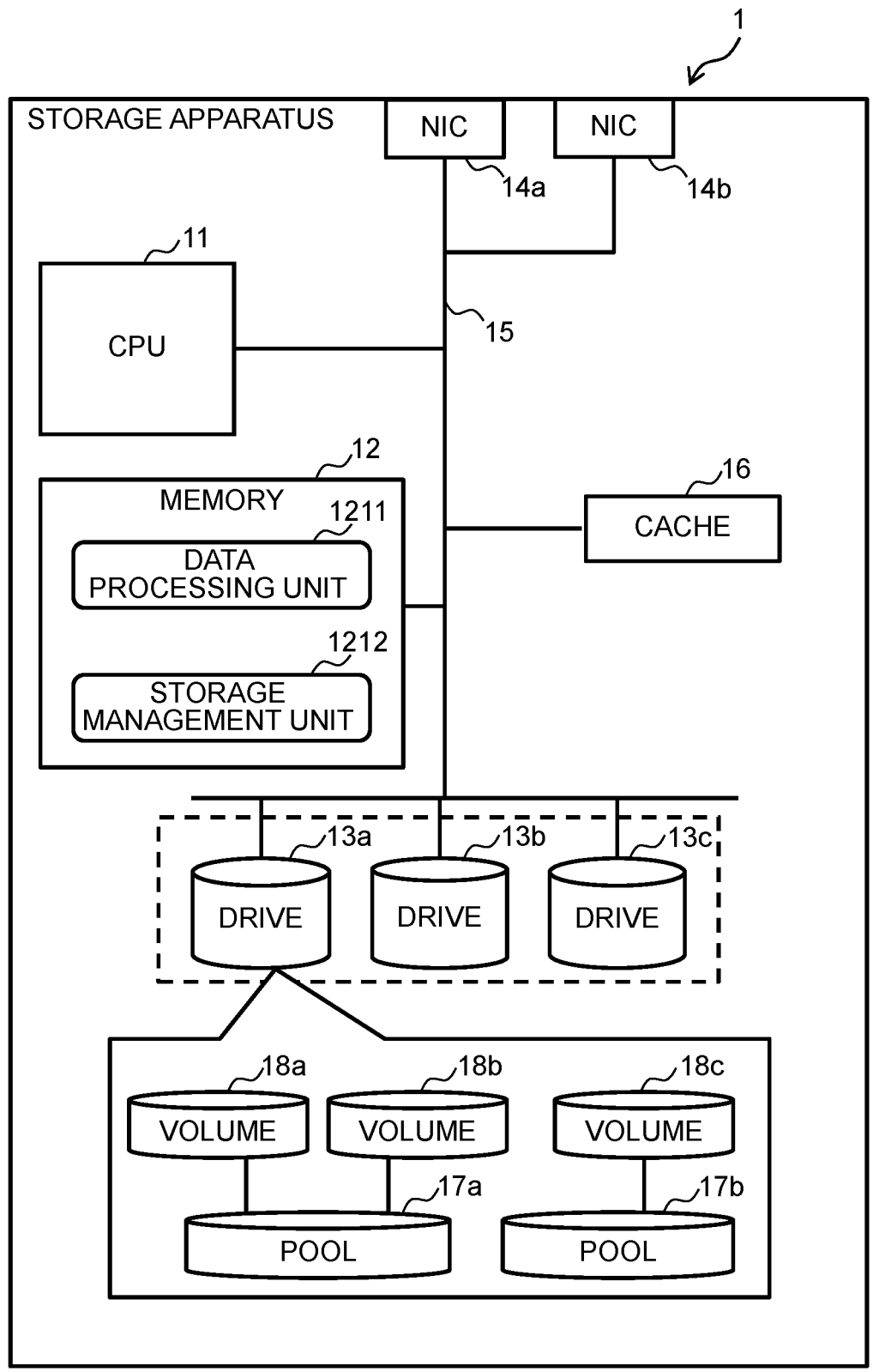
FIG. 3 is a configuration diagram of a storage apparatus.

FIG. 3 is a configuration diagram of the storage apparatus 1 according to the first embodiment. All the storage apparatuses 1a, 1b, 1c have the configuration of the storage apparatus 1 explained below in common. The storage apparatus 1 includes a CPU (Central Processing Unit) 11 which is an example of a processor, a memory 12 which is an example of a storage unit, drives 13, network interface cards (Network Interface Cards: NICs) 14a, 14b, a bus 15, and a cache 16. The storage apparatus 1 also includes: pools 17a, 17b as logical areas to virtually put together physical areas of the drives 13; and volumes 18a, 18b, 18c as areas to be logically assessed when reading/writing data.

Figure 4:
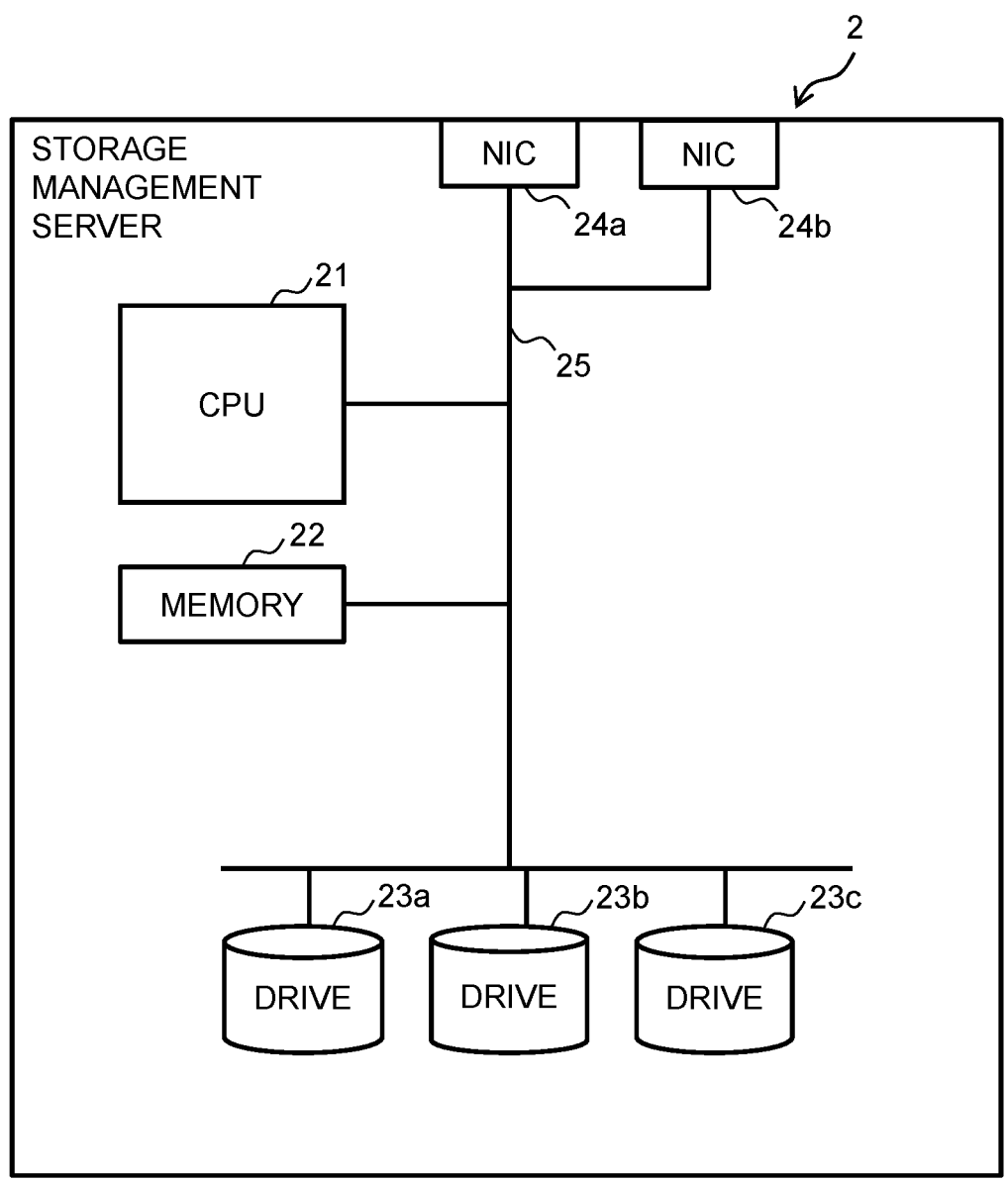
FIG. 4 is a configuration diagram of a storage management server.

The quantity of the CPU(s) 11, the memory (or memories) 12, and the cache(s) 16 is not limited to the quantity illustrated in the drawing. The drives 13 may be any one of HDDs (Hard Disk Drives), SSDs (Solid State Drives), and other non-volatile memories (SCM: Storage Class Memories). Moreover, three drives are illustrated in FIG. 4, but the quantity of drives is not limited to the quantity illustrated in the drawing. The quantity of the pools 17a, 17b, and the volumes 18a, 18b, 18c which are logical areas is not limited to the quantity illustrated in the drawing.

The NIC 14a is an interface coupled to the network N1 inside the data center to communicate with the storage management server 2; and the NIC 14b is an interface coupled to a network for I/O data which is not illustrated in the drawing and is coupled to a host that accesses the data and is not illustrated in the drawing. Incidentally, communication standards which the NICs 14a, 14b accommodate are not particularly limited and any communication standards such as Fiber Channel, IEEE802.3, and so on may be used. Furthermore, if the network N1 inside the data center and the network for the I/O data are the same, the NICs 14a, 14b may be the same hardware. Each of the NICs 14a, 14b is illustrated as one NIC; however, the quantity of NICs is not limited to the quantity illustrated in the drawing. The bus 15 is an internal bus for coupling the CPU 11, the memory 12, the drives 13, the NICs 14a, 14b, and the cache 16 together. The cache 16 is an area where data are temporarily cached to access the data which accesses the drives at high speeds.

The memory 12 includes a data processing unit 1211 which executes processing for reading/writing data, and a storage management unit 1212 which replies to a management operation by receiving a request from the storage management server 2.

Configuration of Storage Management Server 2

FIG. 4 is a configuration diagram of the storage management server 2. The storage apparatus 1 includes a CPU 21 which is an example of a processor, a memory 22 which is an example of a storage unit, drives 23, NICs 24a, 24b, and a bus 25. The quantity of the CPU(s) 21 and the memory (or memories) 22 is not limited to the quantity illustrated in the drawing. The drives 23 may be any one of HDDs, SSDs, and other non-volatile memories. Moreover, if the drives coupled to the network are storage devices, the storage management server 2 does not have to include the drives 23.

The NIC 24a is an interface coupled to the network N1 inside the data center to communicate with the storage apparatuses 1a, 1b, 1c. The NIC 24b is an interface coupled to the network N2 outside the data center to communicate with the operational information management system 3. Incidentally, communication standards which the NICs 24a, 24b accommodate are not particularly limited and any communication standards such as Fiber Channel, IEEE802.3, and so on may be used. Furthermore, if the network N1 inside the data center and the network N2 outside the data center are the same, the NICs 24a, 24b may be the same. Two NICs are illustrated in FIG. 4, but the quantity of NICs is not limited to the quantity illustrated in the drawing. The bus 25 is an internal bus for coupling the CPU 21, the memory 22, the drive 23, and the NIC 24a, 24b together.

Configuration of Operational Information Management System 3

Figure 5:
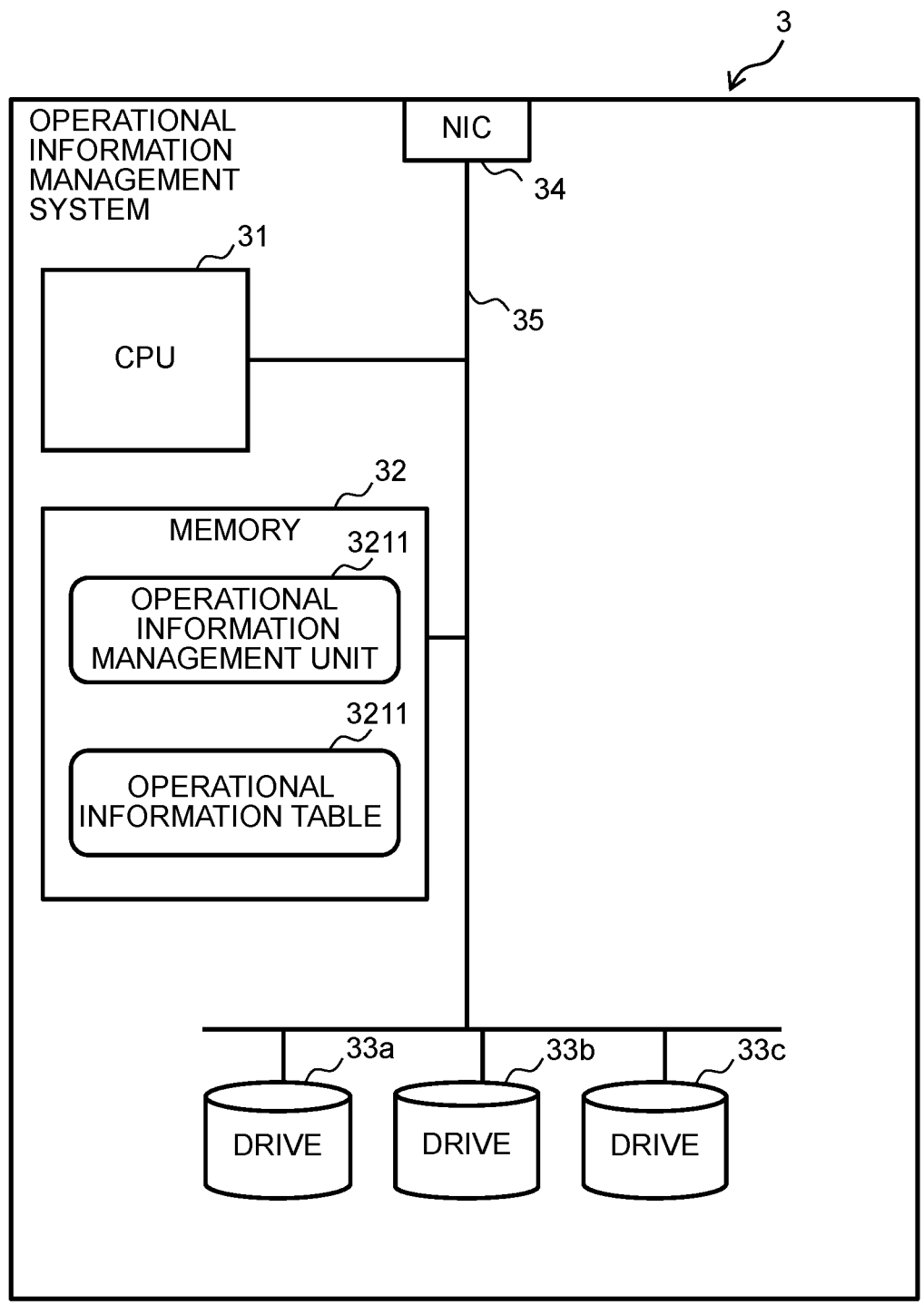
FIG. 5 is a configuration diagram of an operational information management system.

FIG. 5 is a configuration diagram of the operational information management system 3. The operational information management system 3 includes a CPU 31 which is an example of a processor, a memory 32 which is an example of a storage unit, drives 33, an NIC 34, and a bus 35. The quantity of the CPU(s) 11 and the memory (or memories) 12 is not limited to the quantity illustrated in the drawing. The drives 33 may be any one of HDDs, SSDs, and other non-volatile memories. Moreover, if the drives coupled to the network are storage devices, the drives 13 themselves do not have to be retained. Moreover, three drives are illustrated in FIG. 5, but the quantity of drives is not limited to the quantity illustrated in the drawing.

The NIC 34 is an interface coupled to the network N2 outside the data center to communicate with the storage management server 2. Incidentally, communication standards which the NIC 34 accommodates are not particularly limited and any communication standards such as Fiber Channel, IEEE802.3, and so on may be used. One NIC is illustrated in FIG. 4, but the quantity of NICs is not limited to the quantity illustrated in the drawing. The bus 35 is an internal bus for coupling the CPU 31, the memory 32, the drives 33, and the NIC 34 together.

The memory 32 stores an operational information management unit 3211 and an operational information table 3221. The operational information management unit 3211 is a program for updating the operational information table 3221 by referring to an operational operation executed at each data center and its result. The operational information management unit 3211 communicates with, for example, the storage management server 2 and updates the operational information table 3221 by referring to the operation result information of the storage apparatuses 1a, 1b, 1c in each data center 4a, 4b. Alternatively, inquiry information between storage apparatus users and a storage apparatus provider may be managed by a human(s) and the operational information may be set by a human(s).

The operational information table 3221 retains the operation result information of the storage apparatuses 1a, 1b, 1c in each data center 4a, 4b. The operational information table 3221 is referenced by the operational information management unit 3211 and is updated by the operational information management unit 3211.

Figure 6:
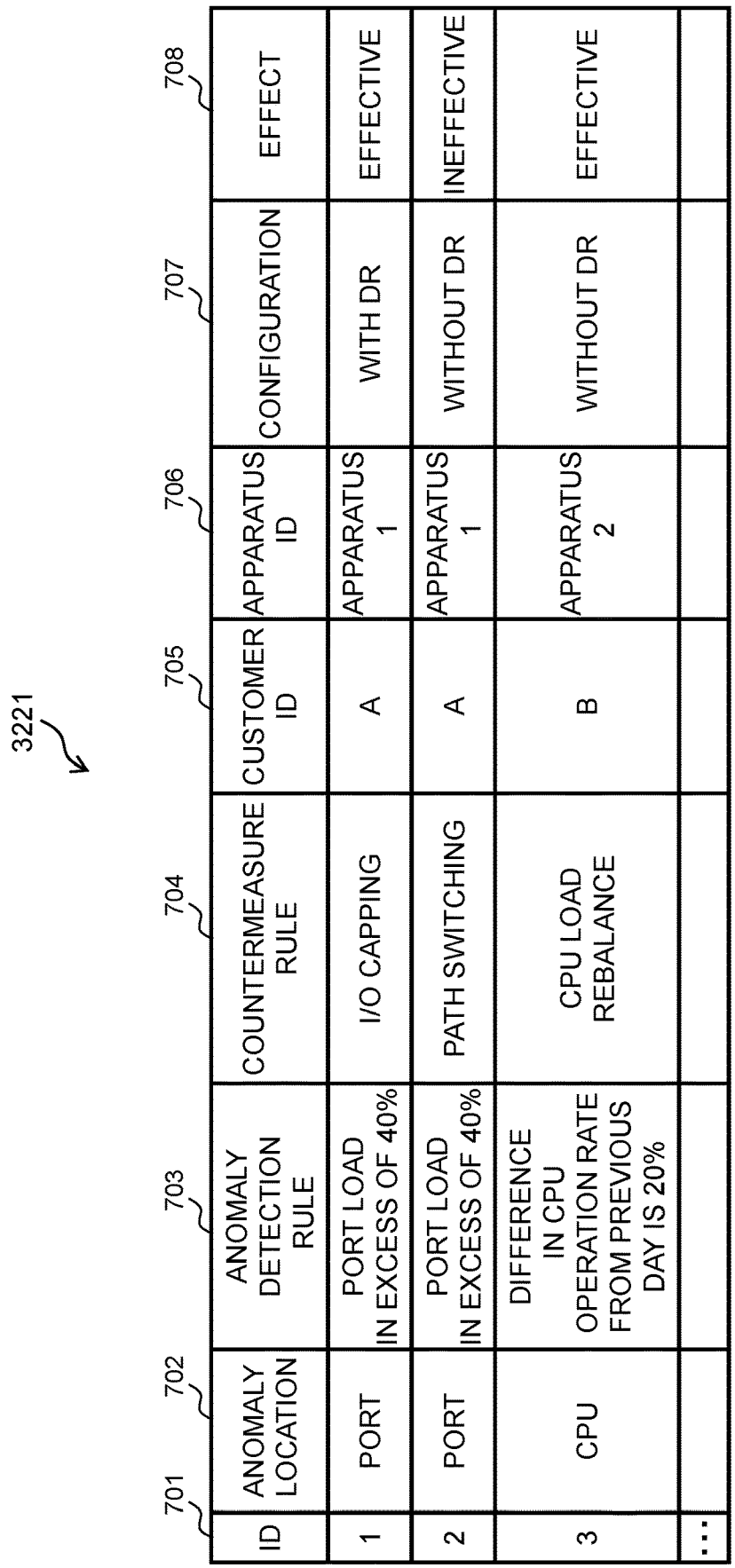
FIG. 6 is a diagram illustrating programs and information in a memory in the storage management server according to the first embodiment.

FIG. 6 is a diagram illustrating an example of the operational information table 3221. FIG. 6 describes the operational information table 3221 in a table format; however, the table format is used merely for visualization purpose to explain the information and a method for storing the information is not limited to a table. The operational information table 3221 has one or more records and each record includes the following information. Specifically speaking, each record includes: an ID 701 which is an identifier of the operational information; an anomaly location 702 indicating an anomaly cause location at the time of the occurrence of an anomaly; an anomaly detection rule 703 for the anomaly cause location; a countermeasure rule 704 indicating a countermeasure method for the detected anomaly; a customer ID 705 indicating at which customer the anomaly has occurred and for which customer the countermeasure is to be performed; an apparatus ID 706 indicating at which storage apparatus the anomaly has occurred, and for which storage apparatus the countermeasure is to be performed; a configuration 707 indicating a RAID level configuration at the time of the occurrence; and an effect 708 indicating the effect of the countermeasure method.

In the example illustrated in FIG. 6, the configuration 707 only indicates whether a DR (Disaster Recovery) configuration exists or not; however, without limitation to this example, various setting information of the storage apparatuses may be retained such as a copy (local or remote) configuration, an HA (High Availability) configuration, a virtualization configuration, a data compression setting, a data deduplication setting, whether an encryption setting exists or not, and an I/O capping setting. Furthermore, in the example illustrated in FIG. 6, the effect 708 only indicates whether the effect is effective or not; however, without limitation to this example, any one of processing time of the countermeasure processing, influences of the countermeasure processing, and an improvement degree may be retained other than the above-mentioned effect. The influences of the countermeasure processing are, for example, side effects, a variable amount of an I/O load during the execution of the processing, a variable amount of a CPU processing load of the storage apparatus, and a variable amount of a memory usage amount. The improvement degree is, for example, an improvement of a port load from 50% to 20%.

Programs and Information Stored in Storage Management Server 2

Figure 7:
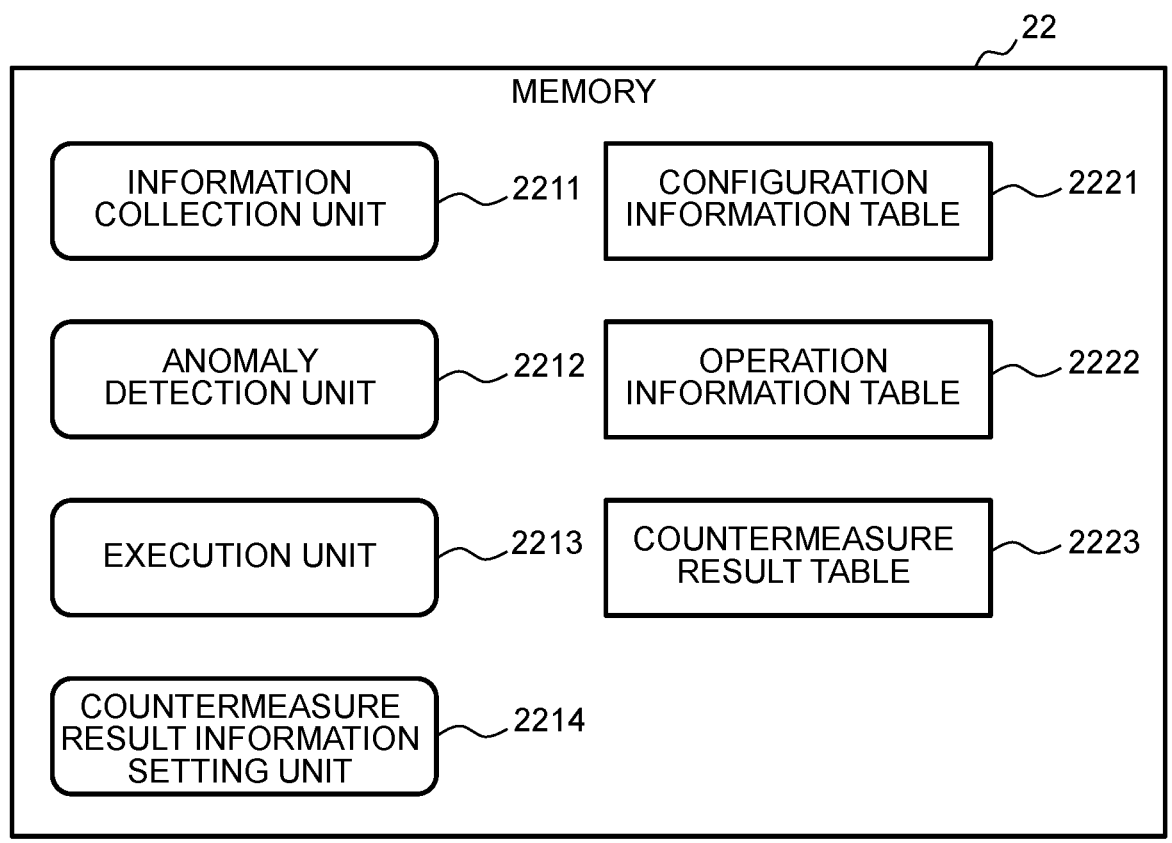
FIG. 7 is a diagram illustrating an example of an operational information table.

FIG. 7 is a diagram illustrating programs and information which are stored in the memory 22 in the storage management server 2. The memory 22 stores the information collection unit 2211, the anomaly detection unit 2212, the execution unit 2213, the countermeasure result information setting unit 2214, the configuration information table 2221, the operation information table 2222, and the countermeasure result table 2223. The information collection unit 2211, the anomaly detection unit 2212, the execution unit 2213, and the countermeasure result information setting unit 2214 are programs.

The information collection unit 2211 regularly collects the configuration information and the operation information from the storage apparatus 1. The information collection unit 2211 is regularly executed and regularly updates the configuration information table 2221 and the operation information table 2222. The anomaly detection unit 2212 is a program for detecting an anomaly which occurs at the storage apparatus 1. The anomaly detection unit 2212 regularly acquires information of the operation information table 2222 and the countermeasure result table 2223 and judges whether such information is in a state of satisfying the anomaly detection rule 1003 described in the countermeasure result table 2223.

The execution unit 2213 narrows down the countermeasure methods by using the label information included in the countermeasure result table 2223 and carries out a simulation by using the narrowed-down countermeasure method. Then, the execution unit 2213 performs scoring of the simulation result and decides a necessary countermeasure method. The countermeasure result information setting unit 2214 updates the countermeasure result table 2223 by using the execution result of the execution unit 2213 and the operational information of the operational information management system 3.

The configuration information table 2221 stores the configuration information of the storage apparatus 1. The operation information table 2222 stores the operation information of the storage apparatus 1. The countermeasure result table 2223 stores actual result information such as an anomaly which occurred at the storage apparatus 1 and its countermeasure, a type, a customer of the target apparatus, an apparatus identifier, configuration information at the time of the anomaly countermeasure, and the countermeasure result.

FIG. 8 is a diagram illustrating an example of the configuration information table 2221. FIG. 8 illustrates the configuration information table 2221 in a table format; however, the table format is used merely for visualization purpose to explain the information and a method for storing the information is not limited to a table. The configuration information table 2221 has one or more records and each record includes the following information. Specifically speaking, each record includes: an apparatus ID 801 which is an identifier of the relevant storage apparatus 1; a resource type 802 indicating the type of a resource which the storage apparatus 1 has; a resource ID 803 which is an identifier of the resource; a related resources 804 indicating a related resource(s); and a spec 805 indicating the spec (such as size and speed) of each resource.

The resource type 802 is, for example, the type(s) of the resource(s) included by the storage apparatus 1 such as a CPU(s), a cache(s), an NIC(s), a drive(s), a pool(s), and a volume(s). In FIG. 8, the resource ID 803 is a combination of the resource type and a number. However, the resource ID of an NIC is a combination of "Port" and a number. The related resources 804 also includes a relationship between resources such as a logical-physical relationship between drives and pools, a relationship between logical resources such as pools and volumes, and a replication relationship between apparatuses as described in a record of FIG. 8 in which the resource ID 803 is "Volume 3." Regarding the spec 805, not only a numerical spec of the physical and logical configuration, but also various types of setting information which is set to the resources may be set. Specifically speaking, in a case of a pool, an automatic hierarchical control setting may be set; and in a case of a volume, whether a data compression setting exists or not, whether a data deduplication setting exists or not, whether an encryption setting exists or not, and whether an I/O capping setting exists or not may be set.

FIG. 9 is a diagram illustrating an example of the operation information table 2222. FIG. 9 illustrates the operation information table 2222 in a table format; however, the table format is used merely for visualization purpose to explain the information and a method for storing the information is not limited to a table. The operation information table 2222 has one or more records and each record includes the following information. Specifically speaking, each record stores history information of the operation information of each resource; and specifically, each record includes an apparatus ID 901 which is an identifier of the relevant storage apparatus, a resource type 902 indicating information of the type of a resource(s) possessed by the storage apparatus, a resource ID 903 which is an identifier of the relevant resource, a metric 904 which is metric information retained by each resource, a time of day 905 indicating history information of each metric, and an amount 906 which is an operation information amount at each time of day.

The metric 904 includes information which varies depending on the resource type and is one or more types of information. The time of day 905 indicates the information of every five seconds in the drawing; however, that time interval has no particular limitation and may be an arbitrary amount of time. The amount 906 illustrates the information at the relevant time of day; however, without limitation to this example, the amount 906 may be a difference from the previous time of day or information of whatever calculation result such as an average between arbitrary times of day.

FIG. 10 is a diagram illustrating an example of the countermeasure result table 2223. FIG. 10 illustrates the countermeasure result table 2223 in a table format; however, the table format is used merely for visualization purpose to explain the information and a method for storing the information is not limited to a table. The countermeasure result table 2223 has one or more records and each record includes the following information. Specifically speaking, each record includes an anomaly which has been detected so far, its countermeasure, and its actual result information; and each record specifically includes an ID 1001 which is an identifier of the operational information, an anomaly location 1002 indicating an anomaly cause location at the time of the occurrence of the relevant anomaly, an anomaly detection rule 1003 of the anomaly cause location, a countermeasure rule 1004 indicating a countermeasure method for the detected anomaly, a label 1005 indicating what type the anomaly detection and the countermeasure rule are, a customer ID 1006 indicating at which customer the anomaly and the countermeasure occurred, an apparatus ID 1007 indicating at which storage apparatus the anomaly and the countermeasure occurred, a configuration 1008 indicating a RAID level configuration at the time of the occurrence, and an effect 1009 indicating the effect of the relevant countermeasure method.

The label 1005 is information indicating a versatility degree of the countermeasure method indicated in the relevant record. Specifically, the label 1005 can indicate values such as "HW/SW having in common" indicating that hardware and software of the storage apparatus have the anomaly and the countermeasure in common, and "environment-specific" indicating that the relevant anomaly and countermeasure are specific to a specific customer or a specific apparatus. In other words, "HW/SW having in common" in the label 1005 indicates that the countermeasure is universally applicable, it can be rephrased as "universal." Also, "environment-specific" indicates that the countermeasure can be applied to a specific environment, so that it can be paraphrased as "specific."

A record to which the label "HW/SW having in common" is set is set by, for example, a users operation before the operation start time. A record to which the label "environment-specific" is set is added by processing described later. However, the record to which the label "environment-specific" is set may be created by, for example, the users operation before the operation start time.

The configuration 1008 only indicates the DR configuration in this drawing in the same manner as in the operational information table 3221 illustrated in FIG. 6; however, without limitation to this example, various setting information of the storage apparatuses may be retained such as the copy (local or remote) configuration, the HA (High Availability) configuration, the virtualization configuration, the data compression setting, the data deduplication setting, whether the encryption setting exists or not, and the I/O capping setting. Furthermore, in the example illustrated in FIG. 10, the effect 1009 indicates whether the effect is effective or not, in the same manner as in the operational information table 3221 illustrated in FIG. 6; however, without limitation to this example, any one of the processing time of the countermeasure processing, the influences of the countermeasure processing, and the improvement degree may be retained other than the above-mentioned effect. The details are explained with reference to FIG. 6, so that any further explanation is omitted here.

It should be noted that in FIG. 10, the customer ID 1006, the apparatus ID 1007, and the configuration 1008 are treated as information different from the label 1005, but at least one of them may be included in the label 1005. Specifically speaking, information of the computer system to which the label 1005 can be applied, more specifically, configuration information of the computer system and user information of the computer system may be included.

<Processing Flow>

In the following explanation, three major processing sequences executed by the storage management server 2 according to the first embodiment will be explained. The first processing is processing for collecting the configuration information and the operation information. The second processing is processing for updating the countermeasure result table 2223 based on the operational information of another data center (hereinafter referred to as "acquisition update processing"). The third processing is to update the countermeasure result table 2223 based on the countermeasure result during the operation (hereinafter referred to as "operation update processing"). The first processing will be explained briefly and the second processing and the third processing will be explained in detail by referring to flowcharts. In the first processing, the information collection unit 2211 regularly reads the configuration information and the operation information from the storage apparatus 1 and stores them in the configuration information table 2221 and the operation information table 2222.

<Flowchart of Acquisition Update Processing>

Figure 11:
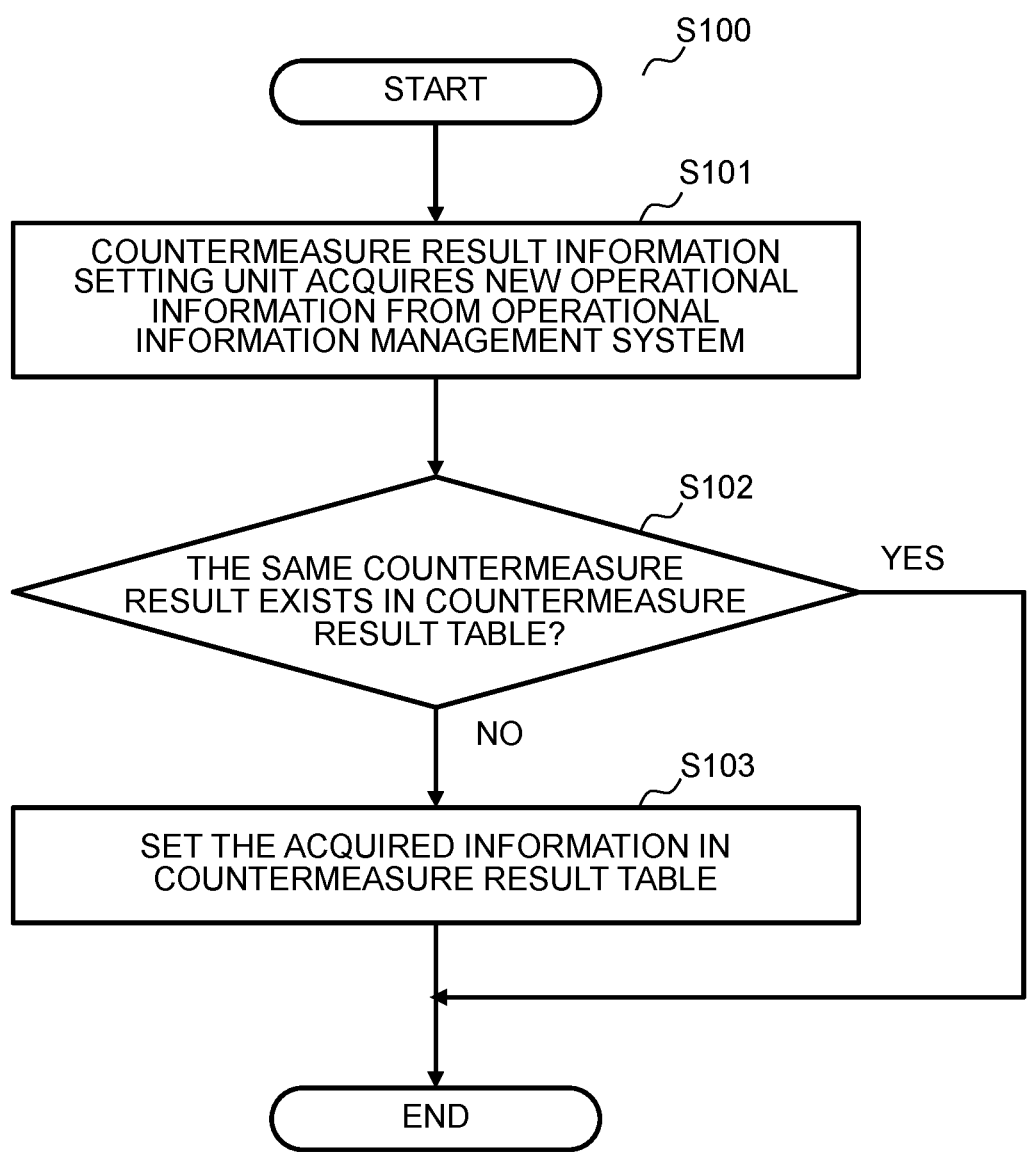
FIG. 11 is a flowchart illustrating acquisition update processing.

FIG. 11 is a flowchart illustrating the acquisition update processing according to the second processing described above. This flowchart corresponds to S2 in FIG. 1. This acquisition update processing is regularly executed. In step S101, the countermeasure result information setting unit 2214 acquires new operational information from the operational information management system 3. The judgment on whether the operational information is new or existing can be implemented by the countermeasure result information setting unit 2214 by managing difference information from the last time. Furthermore, the operational information management unit 3211 in the operational information management system 3 may identify the information of the countermeasure result information setting unit 2214, which is being quelled, and provide only information increased from the last time.

In the subsequent step S102, the countermeasure result information setting unit 2214 judges whether or not the same operational information as the operational information acquired in step S101 already exists in the countermeasure result table 2223. Specifically, the countermeasure result information setting unit 2214 checks whether or not the anomaly location 702, the anomaly detection rule 703, the countermeasure rule 704, the customer ID 705, the apparatus ID 706, and the configuration 707 of the operational information table 3221 match the anomaly location 1002, the anomaly detection rule 1003, the countermeasure rule 1004, the customer ID 1006, the apparatus ID 1007, and the configuration 1008 of the countermeasure result table 2223. If the countermeasure result information setting unit 2214 determines that the same operational information already exists, it terminates the processing illustrated in FIG. 11; and if the countermeasure result information setting unit 2214 determines that the same operational information already does not exist, it proceeds to step S103.

In step S103, the countermeasure result information setting unit 2214 registers the information acquired in step S101, as a new record, in the countermeasure result table 2223 and terminates the processing illustrated in FIG. 11. Specifically, the countermeasure result information setting unit 2214 assigns a new ID number to the record and sets the anomaly location 702, the anomaly detection rule 703, the countermeasure rule 704, the customer ID 705, the apparatus ID 706, the configuration 707, and the effect 708 of the operational information table 3221 to the anomaly location 1002, the anomaly detection rule 1003, the countermeasure rule 1004, the customer ID 1006, the apparatus ID 1007, the configuration 1008, and the effect 1009 of the countermeasure result table 2223, respectively, and sets "environment-specific" to the label 1005.

As a result of the acquisition update processing explained above, the anomaly detection and countermeasure processing executed at a certain data center and its actual result information are registered as actual results which can be used at the target data center and it becomes possible to expand the countermeasure rules (the countermeasure methods).

<Flowchart of Operation Update Processing>

Figure 12:
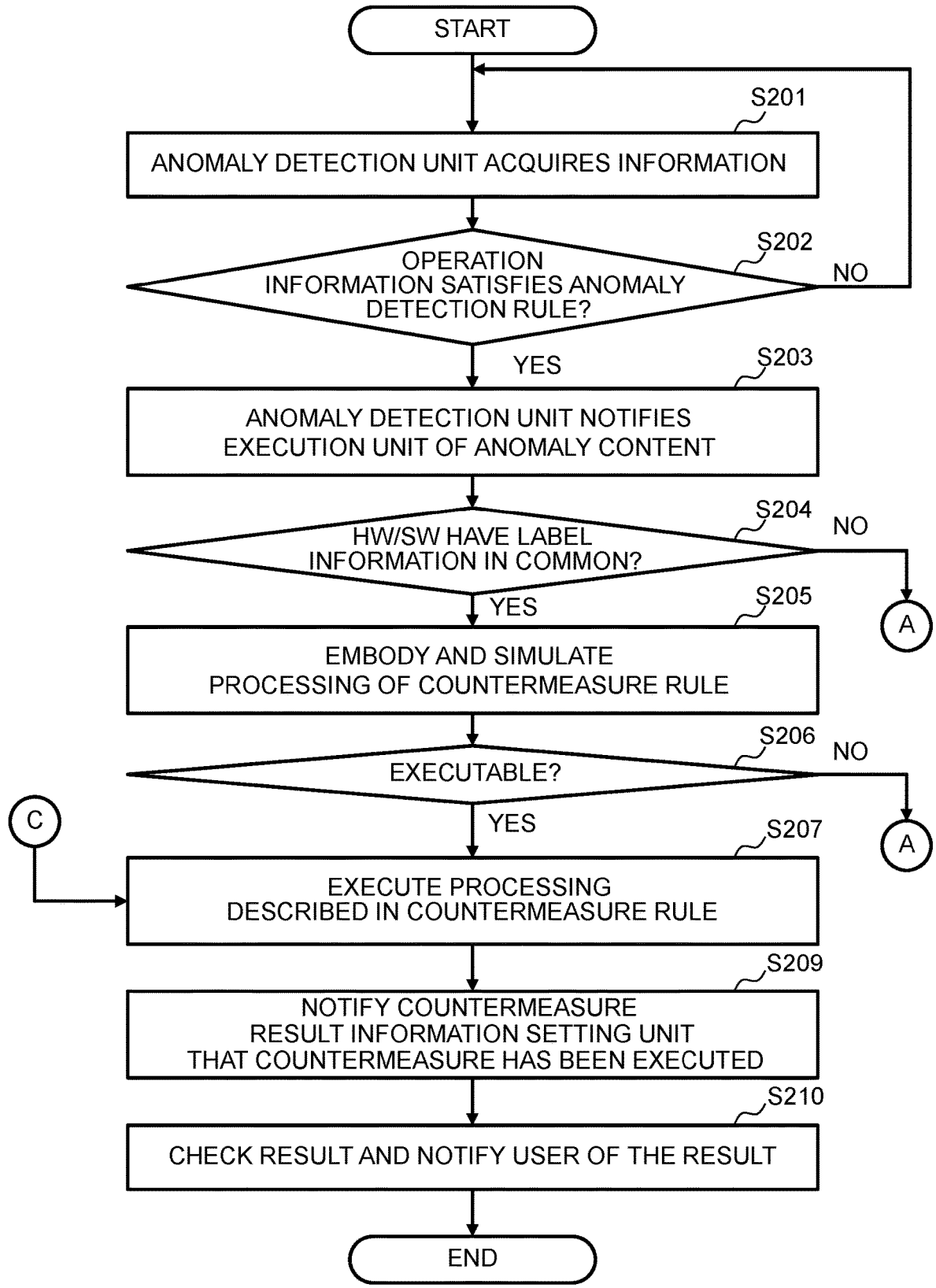
FIG. 12 is a flowchart illustrating operation update processing according to the first embodiment.
Figure 13:
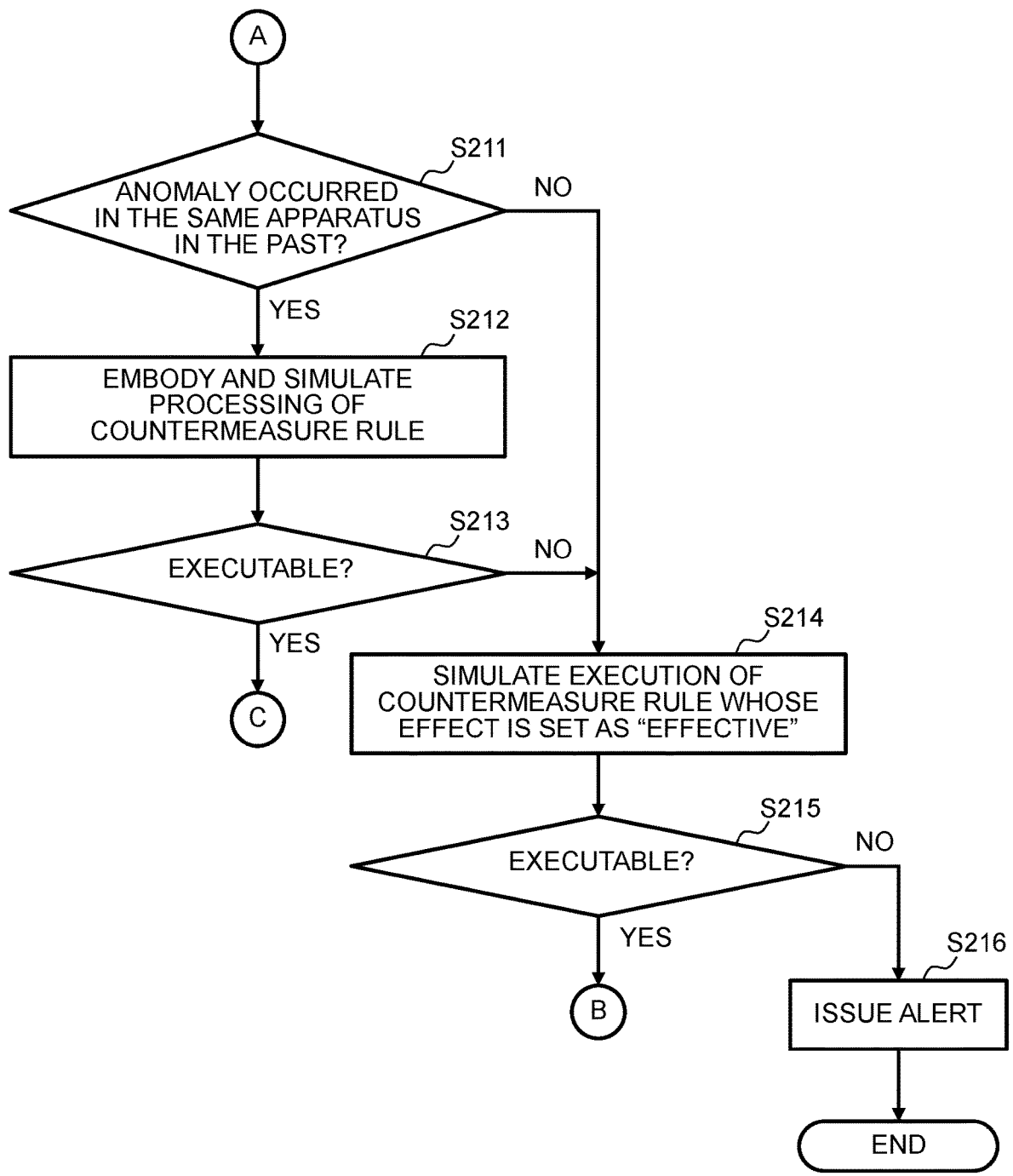
FIG. 13 is a flowchart illustrating the operation update processing according to the first embodiment.
Figure 14:
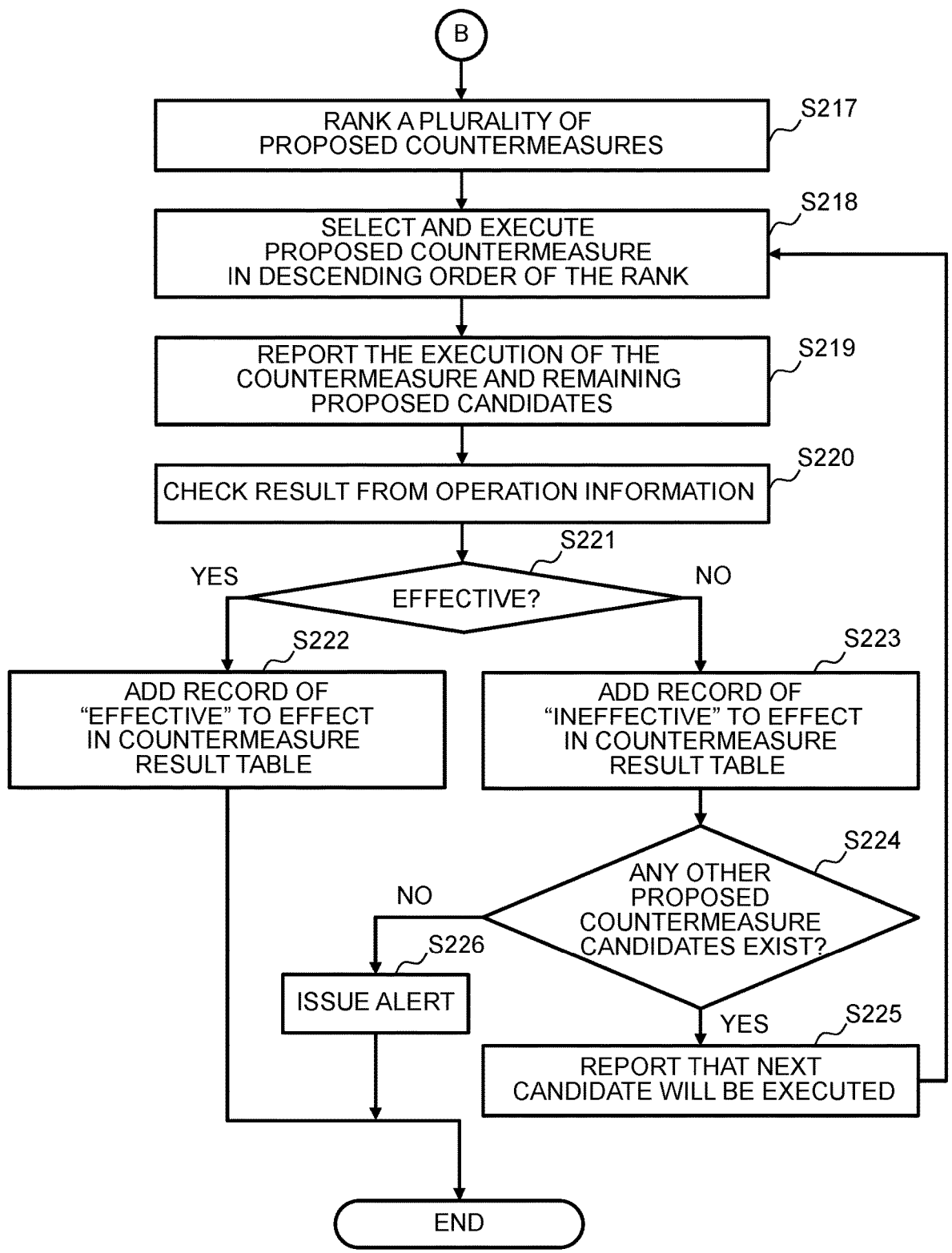
FIG. 14 is a flowchart illustrating the operation update processing according to the first embodiment.

FIG. 12 to FIG. 14 are flowcharts illustrating the operation update processing which is the aforementioned third processing. These flowcharts correspond to S3 to S9 in FIG. 1. In step S201, the anomaly detection unit 2212 acquires the configuration information, the operation information, and the countermeasure result information from the operation information table 2222 and the countermeasure result table 2223, respectively. In step S202, the anomaly detection unit 2212 judges whether or not the content of the configuration information and the operation information satisfies the anomaly detection rule 1003 of the countermeasure result table 2223. If the anomaly detection unit 2212 determines that the content of the configuration information and the operation information satisfies the anomaly detection rule 1003, it proceeds to step S203; and if the anomaly detection unit 2212 determines that the content of the configuration information and the operation information does not satisfy the anomaly detection rule 1003, it returns to step S201. Incidentally, the configuration information is not mentioned for the sake of drawing convenience in step S202 in FIG. 12 and it is not intended to exclude the configuration information.

In step S203, the anomaly detection unit 2212 notifies the execution unit 2213 of anomaly content. The anomaly content to be reported is, for example, the content of the anomaly detection rule 1003 which was determined to be satisfied by the configuration information and the operation information in step S202. In the subsequent step S204, the execution unit 2213 determines whether or not the label 1005 of the countermeasure result table 2223 corresponding to the anomaly content is "HW/SW having in common." If the anomaly detection unit 2212 determines that the label 1005 is "HW/SW having in common," it proceeds to step S205; and if the anomaly detection unit 2212 determines that the label 1005 is not "HW/SW having in common," it proceeds via A in a circle to step S211 in FIG. 13.

In step S205, the execution unit 2213 embodies the processing described in the countermeasure rule 1004 of the countermeasure result table 2223 on the basis of the information described in the configuration information table 2221 and the operation information table 2222. Furthermore, in this step, the execution unit 2213 simulates this embodied processing. This simulation is to judge whether the processing described in the countermeasure rule 1004 is executable or not.

The simulation in this step is, for example, to calculate a value of a processing load on the storage apparatus side or I/O performance by using the spec in the configuration information table 2221 and history information of processing loads in the past in the operation information table 2222. If the calculated value is less than the anomaly state described in the anomaly detection rule 1003 or if the processing time of the countermeasure processing or the influence of the countermeasure processing which is a specific example of the effect 1009 in the countermeasure result table 2223 is less than a specific index, it is determined that the processing is executable. As another method, whether the processing can be implemented or not may be judged by checking whether or not there is any violation of a target performance value designated by the user by using the aforementioned various kinds of information. The target performance value is, for example, a value of IOPS of Service Level Agreement or latency.

When executing the countermeasure rule 1004 described in the countermeasure result table 2223 during the embodiment of the processing in this step, it is sometimes necessary to select any one of a plurality of resources within the apparatus. Regarding a method of this selection, for example, a plurality of proposals, that is, expansion rules may be derived from one countermeasure rule by using the technology described in PTL 1 to create expansion rules from general purpose rules, and a simulation may be carried out by considering the respective expansion rules as proposed countermeasure candidates. Moreover, the simulation may be carried out by selecting one piece of the largest operation information, that is, the operation information which has the most effective effect, from among the operation information of the respective resources, and deciding one proposed candidate to be executed from one countermeasure rule.

Furthermore, the following plurality of means may be taken to select the resource(s). As a first means, not only settings of a single resource can be changed, but also settings of a plurality of related resources can be collectively changed by referring to, for example, the configuration information table 2221 if the resources whose settings should be changed have the replication relationship. As a second means, processing regarding which volumes having the replication configuration exist in the same apparatus can be excluded. Regarding a third means, for example, if data needs to be migrated, the migration causes the deduplication setting to become no longer effective and, therefore, the relevant resource(s) can be excluded from a migration target; and it is possible to include processing for, for example, collectively setting a plurality of resources or excluding the relevant resource(s) from a setting target(s) in consideration of characteristics of the configuration and settings of the apparatus.

In step S206, the execution unit 2213 judges whether the countermeasure rule embodied in step S205 can be executed or not, on the basis of the simulation in step S205. If the execution unit 2213 determines that the countermeasure rule can be executed, it proceeds to step S207; and if the execution unit 2213 determines that the countermeasure rule cannot be executed, it proceeds via A in a circle to step S211 in FIG. 13.

If an affirmative judgment is obtained in step S206 or an affirmative judgment is obtained in step S213 described later, step S207 is executed. In step S207, the execution unit 2213 executes processing described in the countermeasure rule 1004 indicated in the countermeasure result table 2223 with respect to the storage apparatus 1. In the subsequent step S209, the execution unit 2213 notifies the countermeasure result information setting unit 2214 that the countermeasure has been executed. In step S210, after the execution of the processing by the execution unit 2213, the countermeasure result information setting unit 2214 collects the operation information from the operation information table 2222 for a certain period of time, checks the results, notifies the user of the results, and terminates the processing illustrated in FIG. 12.

If a negative judgment is obtained in step S204 or step S206 in FIG. 12, the processing illustrated in FIG. 13 is started via A in a circle from step S211. In step S211, the execution unit 2213 checks the apparatus ID 1007 of the countermeasure result table 2223 and judges whether or not the relevant anomaly is an anomaly which occurred in the same apparatus in the past. If the execution unit 2213 determines that the relevant anomaly is the anomaly which occurred in the same apparatus in the past, it proceeds to step S212; and if the execution unit 2213 determines that the relevant anomaly is not the anomaly which occurred in the same apparatus in the past, it proceeds to step S214.

In step S212, the execution unit 2213 simulates the processing described in the countermeasure rule 1004 in the countermeasure result table 2223. Since the processing of this step is similar to that of step S205, any detailed explanation about it is omitted. In the subsequent step S213, the execution unit 2213 judges, based on the result of the simulation in step S212, whether the countermeasure rule 1004 embodied in step S212 can be executed or not. If the execution unit 2213 determines that the countermeasure rule 1004 can be executed, it proceeds via C in a circle to step S207 in FIG. 12; and if the execution unit 2213 determines that the countermeasure rule 1004 cannot be executed, it proceeds to step S214.

In step S214, the execution unit 2213 identifies all the remaining countermeasure rules 1004 regarding which their anomaly detection rules 1003 described in the countermeasure result table 2223 are the same and their effects 1009 are set as "effective." Then, the execution unit 2213 simulates all the identified countermeasure rules 1004. Since the simulation executed in this step is similar to that executed in step S205 and step S212, any detailed explanation is omitted. For example, if the anomaly content reported in step S203 is "port load in excess of 40%," the simulation is carried out in step S214 regarding the "I/O capping" whose ID 1001 is "4" in the countermeasure result table 2223 illustrated in FIG. 10.

In the subsequent step S215, the execution unit 2213 judges, based on the result of the simulation in step S212, whether the countermeasure rule 1004 embodied in step S214 can be executed or not. If the execution unit 2213 determines that the countermeasure rule 1004 can be executed, it proceeds via B in a circuit to step S217 in FIG. 14; and if the execution unit 2213 determines that the countermeasure rule 1004 cannot be executed, it proceeds to step S216. In step S216, the execution unit 2213 cannot obtain the effect with any one of the proposed countermeasure candidates and, therefore, issues an alert and terminates the processing.

If an affirmative judgment is obtained in step S215 in FIG. 13, the processing illustrated in FIG. 14 is started via B in a circle from step S217. In step S217, a plurality of proposed countermeasures which can be determined as being effective are ranked by using the results of the simulation in step S214. As a ranking method, for example, any one of the following four methods can be adopted.

A first method is to evaluate the degree of effect by evaluating how much a value of the condition for the anomaly detection rule 1003 will improve. For example, if the anomaly detection rule 1003 that is the CPU utilization rate in excess of 40% is satisfied, the first method is a method for ranking the proposed countermeasures on the basis of how much the CPU utilization rate will improve. A second method is a method for ranking the proposed countermeasures on the basis of the Service Level Agreement by the user, for example, IOPS which is the I/O count per second, or a value of latency.

A third method is a method for ranking the proposed countermeasures on the basis of the effect in the past by checking the configuration 1008 in the countermeasure result table 2223 and determining that a similar effect will be obtained if the relevant configuration is the same configuration as that at the time of the occurrence of a problem in the past. Incidentally, the configuration 1008 indicates only a RAID level; however, without limitation to this example, regarding the configurations such as the copy (local or remote) configuration, the HA configuration, the virtualization configuration, the data compression setting, the data deduplication setting, whether the encryption setting exists or not, and the I/O capping setting, the similarity between the above-mentioned configurations and the configurations in the past may be calculated and the ranking may be performed according to how high the similarity is.

A fourth method is a method of calculating weights of the degree of effect mentioned earlier, the improvement degree of the index of the Service Level Agreement, and the similarity of the configurations and ranking the proposed countermeasures in descending order of the total point of the calculation.

In the subsequent step S218, the execution unit 2213 selects and executes a proposed countermeasure of the highest rank in descending order with respect to the proposed countermeasures ranked in step S217. Specifically, when executing step S218 for the first time, the execution unit 2213 selects and executes the proposed countermeasure of the highest rank; and after returning from step S225 and when executing step S218 for the second time, the execution unit 2213 selects and executes a proposed countermeasure of the second highest rank. In the subsequent step S219, the execution unit 2213 notifies the countermeasure result information setting unit 2214 of the execution of the countermeasure(s), the details of that processing, and whether there is/are any remaining proposed countermeasure candidate(s) or not.

In the subsequent step S220, after the execution of the processing, the countermeasure result information setting unit 2214 collects the operation information from the operation information table 2222 for a certain period of time and checks the result of the processing. In the subsequent step S221, the execution unit 2213 judges, based on the check in step S220, whether the effect is effective or not with respect to the execution result of the proposed countermeasure in step S218. If the execution unit 2213 determines that the effect is effective, in other words, that it is below the anomaly state described in the anomaly detection rule 1003, it proceeds to step S222; and if the execution unit 2213 determines that the effect is ineffective or is not sufficient, it proceeds to step S223.

In step S222, the countermeasure result information setting unit 2214 adds a new record to the countermeasure result table 2223, sets various kinds of values, and terminates the processing illustrated in FIG. 12 to FIG. 14. When doing so, the label 1005 is set as "environment-specific" and the effect 1009 is set as "effective." In step S223, the countermeasure result information setting unit 2214 adds a new record to the countermeasure result table 2223 and proceeds to step S224. When doing so, the effect 1009 is set as "ineffective."

In step S224, the countermeasure result information setting unit 2214 judges whether not it has been notified by the execution unit 2213 that another proposed countermeasure candidate(s) exists. If the countermeasure result information setting unit 2214 determines that another countermeasure candidate exists, it proceeds to step S225; and if the countermeasure result information setting unit 2214 determines that another countermeasure candidate does not exist, it issues an alert in step S226 and terminates the processing illustrated in FIG. 12 to FIG. 14. In step S225, the countermeasure result information setting unit 2214 notifies the execution unit 2213 that the next candidate will be executed, returns to step S218, and repeats the processing.

Through the operation update processing illustrated in FIG. 12 to FIG. 14, if an anomaly is detected during the operation, a countermeasure is determined, the countermeasure is executed, and the result of the countermeasure is evaluated, thereby making it possible to update the countermeasure result table 2223. Furthermore, when determining the countermeasure, it is possible to narrow down countermeasure candidates by referring to the label 1005 and whether the same configuration as that in the past exists or not, and execute the countermeasure before simulating the countermeasure processing or performing the scoring calculation with respect to all the proposed countermeasure candidates. Furthermore, it is also possible to obtain the effect by using a single or minimum proposed countermeasure(s) without necessarily having to execute the plurality of proposed countermeasure.

According to the first embodiment explained above, the anomaly detection and countermeasure processing executed at a certain data center and its actual result information are registered as actual results which can be used at a target data center, thereby making it possible to expand the countermeasure rules (the countermeasure methods). Furthermore, if an anomaly is detected during the operation, the countermeasure is determined, the countermeasure is executed, and the result of the countermeasure is evaluated, thereby making it possible to update the countermeasure result table 2223.

Furthermore, when determining the countermeasure, it is possible to narrow down all the countermeasure candidates, which are the proposed countermeasure candidates, by referring to the label 1005 and whether the same configuration as that in the past exists or not, and execute the countermeasure before simulating the processing or performing the scoring calculation with respect to all the candidates. Furthermore, it is also possible to obtain the effect by using a single or minimum proposed countermeasure(s) without necessarily having to execute the plurality of proposed countermeasures, so that a calculation amount on the system's side to derive the proposed countermeasure(s), a calculation amount on the storage apparatus' side to execute the countermeasure processing, and the processing loads can be reduced from their conventional amounts and loads and the automation of the operational management can be realized with a small processing amount.

According to the aforementioned first embodiment, the following operational advantages can be obtained.

(1) The storage management server 2 which manages the data center 4a having a plurality of storage apparatuses 1, each of which includes the CPU 11 and the drive, stores the countermeasure result table 2223 including a plurality of combinations of the anomaly detection rule 1003 which is the reference for detecting an anomaly, the countermeasure rule 1004 which is a countermeasure against the anomaly, and the effect 1009 indicating the effectiveness of these rules. The storage management server 2 includes: the anomaly detection unit 2212 that detects an anomaly of the computer system 4a on the basis of the operation information acquired from the computer system 4a, and the anomaly detection rule 1003; the execution unit 2213 that decides a countermeasure for the computer system 4a, at which the anomaly has been detected by the anomaly detection unit 2212, on the basis of the detected anomaly, the countermeasure rule, and the effect indicating the effectiveness, and executes the decided countermeasure; and the countermeasure result information setting unit 2214 that evaluates a result of the countermeasure executed by the execution unit 2213 and records the result in the effect indicating the effectiveness in the countermeasure result table 2223. Therefore, a new proposed countermeasure can be added by adding a new record to the countermeasure result table 2223 during the operation.

(2) The countermeasure result table 2223 includes, in each of the combinations, the label 1005 indicating a relationship between a combination of the anomaly detection rule 1003 and the countermeasure rule 1004, and the computer system 4a. The execution unit 2213: narrows down the countermeasure rule 1004 on the basis of the label 1005, carry out a simulation when the narrowed-down countermeasure rule 1004 is used and applied to the computer system 4a; and decides and executes the countermeasure rule on the basis of the simulation. Therefore, the storage management server 2 can narrow down the countermeasure rule 1004, which should be a target to execute the simulation, by referring to the label 500, so that it is possible to reduce the number of times of simulations and reduce the arithmetic operations.

(3) The label 1005 includes information of the computer system. Therefore, if a plurality of countermeasure rules 1004 are obtained, the storage management server 2 can narrow down the candidates on the basis of the information of the computer system and reduce the arithmetic operations.

(4) The applicable information of the computer system includes the configuration information of the computer system or the user information of the computer system. Therefore, if a plurality of countermeasure rules 1004 are obtained, the storage management server 2 can narrow down the candidates on the basis of the configuration information of the computer system or the user information of the computer system and reduce the arithmetic operations.

(5) The information of the computer system includes at least one of the disaster recovery configuration, the local copy configuration, the high availability configuration, the virtualization configuration, the data compression setting, the data deduplication setting, whether the encryption setting exists or not, and the I/O capping setting. Therefore, the execution unit 2213 can evaluate the environment similarity and rank the plurality of the countermeasure rules 1004.

(6) The effect indicating the effectiveness in the countermeasure result table 2223 includes, in addition to whether the effect is effective or not, at least one of the processing time of countermeasure processing, the processing cost of the countermeasure processing, the side effect of the countermeasure processing, and the improvement degree. Therefore, the execution unit 2213 can rank the plurality of the countermeasure rules 1004 according to the effect (Variation 1)

According the first embodiment, the programs and data which are managed by the operational information management system 3 are used to update the value(s) of the countermeasure result table 2223 via the countermeasure result information setting unit 2214. However, setting by using the programs and the data is nota requisite configuration; and, for example, the administrator may manually communicate with the user of the storage apparatus, manage anomaly information and countermeasure information separately, and manually set the information via the countermeasure result information setting unit 2214. Furthermore, the anomaly information and the countermeasure information which are managed separately may be formed into data and natural language processing of that data may be executed to convert the data into the form which can be dealt with according to this embodiment, thereby updating the countermeasure result table 2223 via the countermeasure result information setting unit 2214; or the values of the countermeasure result table 2223 may be updated by any one of the methods.

(Variation 2)

If a negative judgment is obtained in S206 in FIG. 12, the processing in FIG. 12 may be terminated by issuing an alert instead of proceeding to A in a circle.

(Variation 3)

In the aforementioned first embodiment, the highly-ranked proposed countermeasure is selected and executed in step S218 in FIG. 14. However, a plurality of proposals together with scores may be presented to the user who is the administrator, and a proposed countermeasure selected by the user may be executed.

Second Embodiment

A second embodiment of the storage management server which is the management apparatus will be explained with reference to FIG. 15 to FIG. 20. In the following explanation, the same reference numerals are assigned to the same configuration elements as those in the first embodiment and any difference(s) will be mainly explained. Points which will not be particularly explained are the same as those in the first embodiment. The main difference from the first embodiment is that in this embodiment, in addition to the operations in the first embodiment, any problem(s) which is specific to a customer, such as a deviation from normal operation, is detected as a new anomaly and a countermeasure rule against it is added.

Programs and Data in Memory 22 According to Second Embodiment

Figure 15:
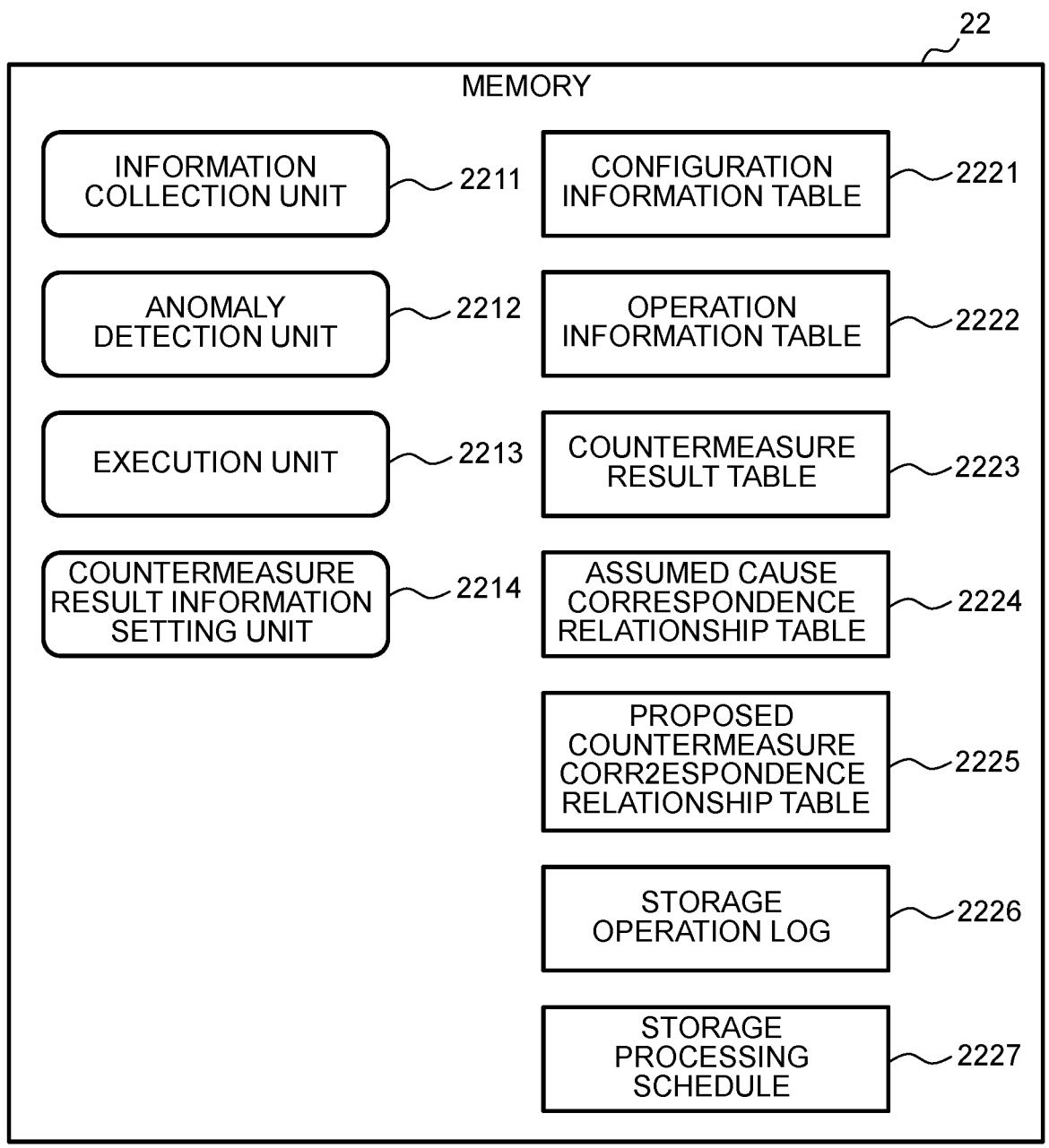
FIG. 15 is a diagram illustrating programs and information in the memory in the storage management server according to a second embodiment.

FIG. 15 is a diagram illustrating programs and information which are stored in the memory 22 in the storage management server 2 according to the second embodiment. In the second embodiment as compared to the first embodiment, an assumed cause correspondence relationship table 2224 and a proposed countermeasure correspondence relationship table 2225 are further stored in the memory 22. The assumed cause correspondence relationship table 2224 is a table indicating combinations of a resource(s) which caused a problem, and all causal events which can be theoretically assumed when the relevant resource is the problem. The proposed countermeasure correspondence relationship table 2225 is a table indicating what kind of proposed countermeasure can be generally taken against the assumed causal event. Incidentally, in this embodiment, the assumed cause correspondence relationship table 2224 and the proposed countermeasure correspondence relationship table 2225 are described separately; however, they may be configured in an integrated manner. The assumed cause correspondence relationship table 2224 and the proposed countermeasure correspondence relationship table 2225 will be hereinafter sometimes collectively referred to as an assumed cause countermeasure 22245.

FIG. 16 is a diagram illustrating an example of the assumed cause correspondence relationship table 2224. FIG. 16 illustrates the assumed cause correspondence relationship table 2224 in a table format; however, the table format is used merely for visualization purpose to explain the information and a method for storing the information is not limited to a table. The assumed cause correspondence relationship table 2224 has one or more records and each record includes the following information. Specifically speaking, each record includes: an apparatus type 1401 indicating the type of the relevant storage apparatus; a resource 1402 indicating at which resource among resources possessed by a model type of the relevant apparatus type an anomaly occurred; and an assumed cause 1403 which is a theoretically-assumed caused when a problem occurred at each resource. FIG. 16 indicates the assumed causes for the resources, but the assumed causes may be managed by associating the relevant assumed cause with each metric of each resource.

FIG. 17 is a diagram illustrating an example of the proposed countermeasure correspondence relationship table 2225. FIG. 17 illustrates the proposed countermeasure correspondence relationship table 2225 in a table format; however, the table format is used merely for visualization purpose to explain the information and a method for storing the information is not limited to a table. The proposed countermeasure correspondence relationship table 2225 has one or more records and each record includes the following information. Specifically speaking, each record includes: an apparatus type 1501 indicating the type of the relevant storage apparatus; an assumed cause 1502 indicating an assumed cause; and a proposed countermeasure candidate 1503 that is a proposed countermeasure which can be theoretically thought of regarding the relevant assumed cause.

FIG. 18 is a diagram illustrating an example of the storage operation log 2226. The storage management server 2 acquires information through the information collection unit 2211. The storage operation log 2226 is a log recorded on the apparatus' side while the storage apparatus is in operation. FIG. 18 illustrates the storage operation log 2226 in a table format; however, the table format is used merely for visualization purpose to explain the information and a method for storing the information is not limited to a table.

The storage operation log 2226 has one or more records and each record includes the following information. Specifically speaking, each record includes: an apparatus ID 1601 which is an identifier of the relevant storage apparatus; a time of day 1602; a log type 1603; a resource ID 1604; and an event 1605 which is an event that occurred at the relevant resource. The log type 1603 indicates, for example, the type of an event which can influence the configuration of the storage apparatus, such as a "failure" indicating the occurrence of a failure at a certain resource or "operation" indicating the operation of the resource. The resource ID 1604 is information of the type similar to the resource ID 803 indicated in the configuration information table 2221. The event 1605 indicates the details of the event with respect to the relevant resource. When the log type 1603 is the "operation," it is desirable that not only the start of the operation, but also the end of the operation be recorded in different records and, regarding the record of the end, a detailed status such as a normal end or abnormal end be further recorded.

FIG. 19 is a diagram illustrating an example of the storage processing schedule 2227. The storage processing schedule 2227 illustrates processing which is regularly executed by the storage apparatus within the apparatus. The storage management server 2 acquires information through the information collection unit 2211. FIG. 19 illustrates the storage processing schedule 2227 in a table format; however, the table format is used merely for visualization purpose to explain the information and a method for storing the information is not limited to a table.

The storage processing schedule 2227 has one or more records and each record includes the following information. Specifically speaking, each record includes: a customer ID 1701 which is an identifier of the relevant customer; an apparatus ID 1702 which is an identifier of the relevant storage apparatus; an apparatus type 1703 indicating the type of the relevant apparatus; a setting type 1704 indicating a schedule setting type; a resource type 1705 which is the type of a resource to which schedule processing is set; a resource ID 1706 which is an identifier of the resource to which the schedule setting is set; processing content 1707 indicating processing content to be scheduled; and a schedule 1708 which is the schedule setting to be processed within the storage apparatus. The resource type 1705 may indicate schedule information of a specific resource as illustrated in FIG. 19 or may indicate schedule information of the entire apparatus.

<Processing Flow>

The operations of the computer system 1S according to the second embodiment are different from those according to the first embodiment with respect to the following two points. The first difference is that the storage operation log is collected. The second difference is that during the operation update processing, a countermeasure method is added when detecting an unknown anomaly state. The collection of the storage operation log, which is the first difference, is regular processing by the information collection unit 2211. The second difference will be explained in detail by referring to the relevant drawing.

<Flowchart of Operation Update Processing>

Figure 20:
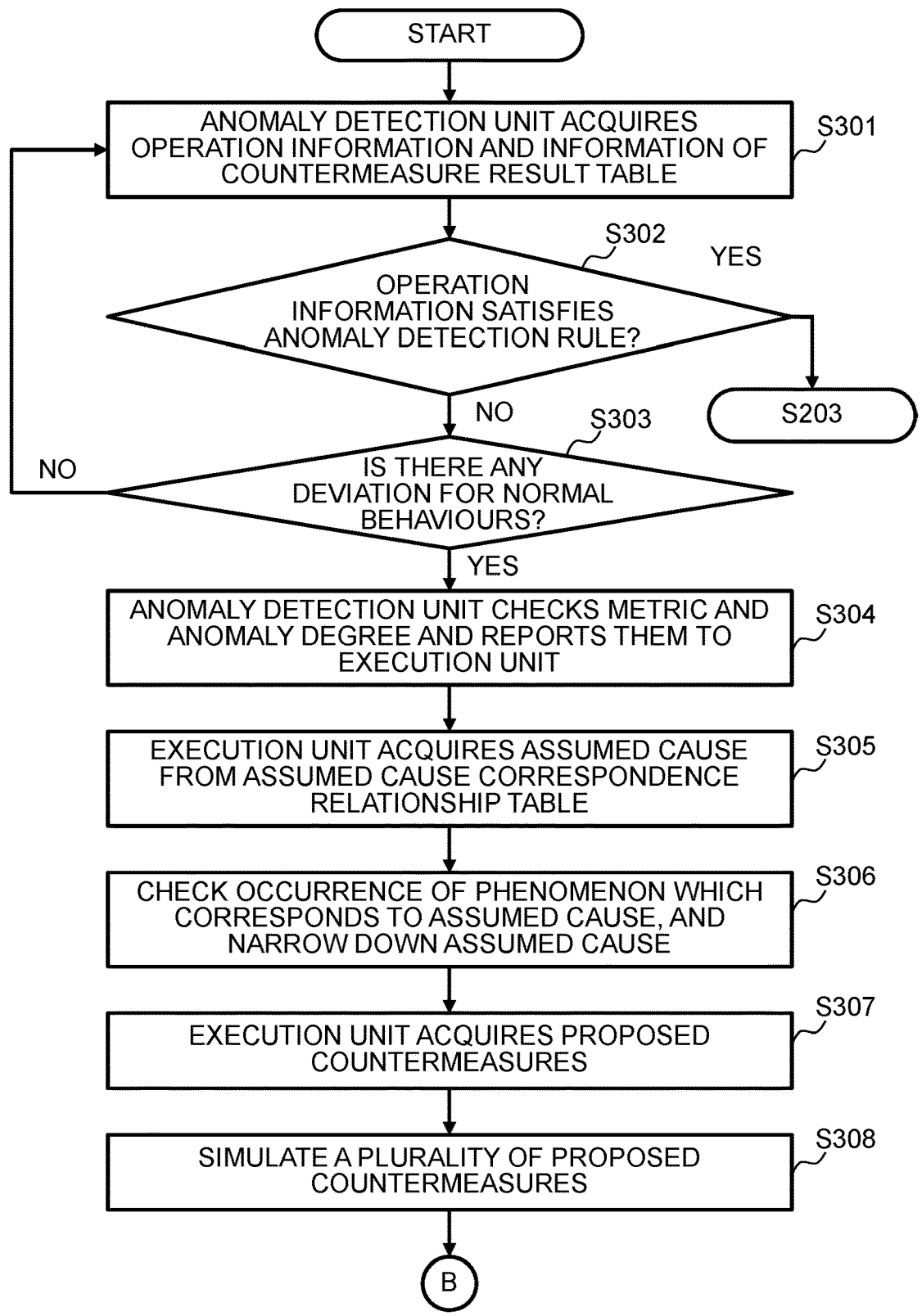
FIG. 20 is a flowchart illustrating operation update processing according to the second embodiment.

FIG. 20 is a flowchart illustrating the operation update processing according to the second embodiment. In step S301, the anomaly detection unit 2212 acquires the operation information and the countermeasure result information from the operation information table 2222 and the countermeasure result table 2223, respectively. In the subsequent step S302, the anomaly detection unit 2212 judges whether or not the content of the operation information satisfies the anomaly detection rule 1003 in the countermeasure result table 2223. If the anomaly detection unit 2212 determines that the content of the operation information satisfies the anomaly detection rule 1003, it proceeds to step S203 in FIG. 12; and if the anomaly detection unit 2212 determines that the content of the operation information does not satisfy the anomaly detection rule 1003, it proceeds to step S303. The processing in step S203 and subsequent steps is similar to that in the first embodiment, so an explanation about it is omitted.

In step S303, the anomaly detection unit 2212 judges whether or not there is any deviation in the operation information from normal behaviors. As a method for checking the deviation from the normal behaviors, for example, any one of three methods explained below can be adopted. A first method is to learn how the operation information changes on an hourly, daily, weekly, or monthly basis by using the history information of the operation information table and determine certain errors (displacements) from the learned content as normal. Then, the first method is a method to: determine the relevant behavior as a normal if the relevant behavior (a value of the operation information) is within the above-mentioned normal range; and determine there is a deviation if any behavior (the operation information) in excess of the normal range occurs.

A second method may be a method to: not determining the occurrence of a deviation if the operation information exceeds the normal range only once by the first method; and determine the occurrence of a deviation if the operation information exceeds the normal range a specified number of times or regularly. A third method is a method, without using the program to determine all deviations, to: present the normal range of usual operation information and information of deviations from the normal range to the user (administrator) and have the user (administrator) determine and input any deviation(s).

In step S303, for example, whether any deviation exists or not is judged by any one of the first to third methods described above; and if it is determined that there is a deviation, the processing proceeds to step S304; and if it is determined that there is no deviation, the processing proceeds to step S301.

In step S304, the anomaly detection unit 2212 checks the resource, metric, and anomaly degree (deviation amount) of the device where the anomaly occurred, and notifies the execution unit 2213 of the checked content. In the subsequent step S305, the execution unit 2213 acquires the list of assumed causes from the assumed cause correspondence relationship table 2224 by using the information of the resource of the device where the anomaly occurred. In the subsequent step S306, the execution unit 2213 checks the I/O performance history information of the operation information table 2222, whether any failure has occurred or not in the storage operation log 2226, the storage operation content, and the processing which regularly occurs in the storage processing schedule 2227. Then, the execution unit 2213 checks a phenomenon/phenomena which occurs during a time slot where any deviation from the normal behaviors occurs, thereby narrowing down operations which may possibly correspond to the relevant assumed cause.

In the subsequent step S307, the execution unit 2213 acquires proposed countermeasures indicated in the proposed countermeasure correspondence relationship table 2225 and the configuration information from the configuration information table 2221 with respect to the narrowed-own assumed cause. In the subsequent step S308, the execution unit 2213 carries out a simulation of executing the acquired plurality of proposed countermeasures. A method of carrying out the simulation is implemented in the same manner as described in step S205. Once the simulation is completed, the processing proceeds via B in a circle to step S217 in FIG. 14. Since the processing in step S217 and subsequent steps is similar to that in the first embodiment, an explanation about it is omitted.

In this embodiment, in addition to the first embodiment, a problem specific to a customer such as a deviation from the normal operations is detected as a new anomaly and a countermeasure rule 1004 for the new anomaly is newly created, thereby making it possible to expand the countermeasure rule 1004. Therefore, countermeasure methods for a larger number of anomalies can be added.

According to the aforementioned second embodiment, the following operational advantages can be obtained.

(7) The storage management server 2 stores, in the memory 22: the assumed cause correspondence relationship table 2224 in which resources of the computer system 4a are associated with their assumed anomaly causes; and the proposed countermeasure correspondence relationship table 2225 which is a combination of anomaly causes and countermeasures against them. If the storage management server 2 detects an anomaly, it selects a resource relating to the detected anomaly, an assumed cause of the resource, and a proposed countermeasure corresponding to the cause by using the assumed cause correspondence relationship table 2224 and the proposed countermeasure correspondence relationship table 2225, decides and executes a countermeasure from the selected proposed countermeasure, and adds a result of the execution, as a combination of the anomaly detection rule, the countermeasure rule, the label, and the effect indicating the effectiveness, to the countermeasure result table 2223. Therefore, the storage management server 2 can newly create a countermeasure rule 1004 for the newly occurred anomaly and expand the countermeasure rule 1004.

(8) The storage management server 2 detects an anomaly by comparing the operation information of the computer system at different times and detecting a divergence of the operation information. Therefore, the storage management server 2 can detect the anomaly by detecting the deviation from the normal operations.

(Variation 1 of Second Embodiment)

If among the proposed countermeasure candidates identified in step S308 in FIG. 20, there is any proposed countermeasure candidate which is influenced by the storage apparatus processing schedule, whose content of the apparatus type 1703 is the customer operation, and whose setting is to be changed, and if it is impossible for the storage apparatus to deal with the anomaly without any proposed countermeasure, the storage management server 2 may inquire of the user and check with the user about the countermeasure method.

(Variation 2 of Second Embodiment)

The memory 22 may store at least one of the storage operation log 2226 and the storage processing schedule 2227. In this case, the execution unit 2213 narrows down candidates for the countermeasure rule 1004 by referring to any one of the storage operation log 2226 and the storage processing schedule 2227 stored in the memory 22.

Third Embodiment

A third embodiment of the storage management server which is the management apparatus will be explained with reference to FIG. 21 to FIG. 23. In the following explanation, the same reference numerals are assigned to the same configuration elements as those in the first embodiment and any difference(s) will be mainly explained. Points which will not be particularly explained are the same as those in the first embodiment. The main difference from the first embodiment is that in this embodiment, the anomaly detection rule(s) and the countermeasure rule(s) change depending on the operation circumstances.

Programs and Data in Memory 22 According to Third Embodiment

Figure 21:
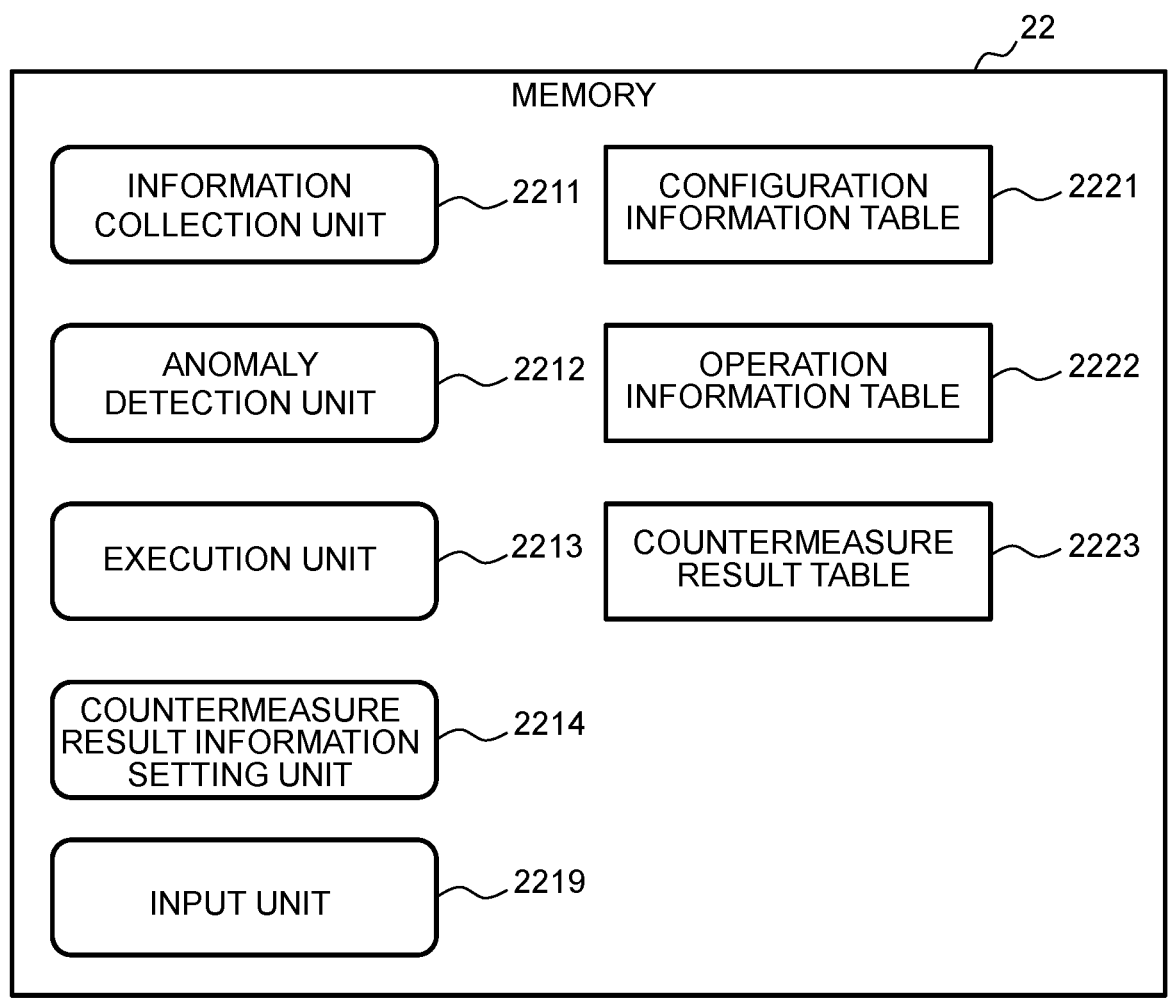
FIG. 21 is a diagram illustrating programs and information in the memory in the storage management server according to a third embodiment.

FIG. 21 is a diagram illustrating programs and information which are stored in the memory 22 in the storage management server 2 according to the third embodiment. As compared to the first embodiment, an input unit 2219 is further included. Also, a countermeasure result table 2223B is stored instead of the countermeasure result table 2223. Furthermore, operations of the anomaly detection unit 2212 are different from those in the first embodiment as described later. The input unit 2219 rewrites a part of the countermeasure result table 2223B in accordance with a command from the user. Its details will be explained later.

FIG. 22 is a diagram illustrating an example of the countermeasure result table 2223B. The countermeasure result table 2223B illustrated in FIG. 22 is different from the countermeasure result table 2223 according to the first embodiment as described below. The countermeasure result table 2223B has an anomaly detection rule 1003A instead of the anomaly detection rule 1003 of the countermeasure result table 2223 according to the first embodiment; and the anomaly detection rule 1003A indicates only an item and does not have a value. Also, the countermeasure result table 22238 includes a reference value 1901 and a variable condition 1902.

The reference value 1901 is a value which serves as a reference for a value detected by the anomaly detection rule 1003A. The variable condition 1902 is a condition indicating how the reference value 1901 or the countermeasure rule is changed by a change in the configuration during the operation or a variable of the operation information. For example, a record with "1" as the ID 1001 as illustrated in FIG. 22 shows an example in which the operation rate to be detected changes depending on the degree of increase of the CPU operation rate. For example, if an increase inclination of the CPU operation rate in the last 10 minutes is equal to or less than 5[%/min], 45% is set as a detection rule by adding a variable of +5% to the value which serves as the reference. Incidentally, if the increase inclination in the last 10 minutes is more than 5, there is no variable in the reference value and 40% is set as the detection rule.

A record with "2" as the ID 1001 shows an example in which the detected operation rate changes due to the configuration created by the user. For example, if a ratio of the number of volumes created from a certain pool by the user exceeds a certain quantity, that value is added to the reference for the operation rate, thereby changing the anomaly detection rule. The variable condition 1902 may be automatically changed during the operation; or the content of the variable condition 1902 may be presented, via a management GUI or the like, to the user or a custom engineer and be further changed during the operation.

Records with "4" and "5" as the ID 1001 show examples, in each of which a port load in excess of 40% is set as a detection rule. If the number of volumes which use the relevant port is equal to or less than "100," the countermeasure rule that is "I/O capping" indicated in the record with "4" as the ID 1001 is selected. If the number of volumes which use the relevant port is more less than "100," the countermeasure rule that is "path switching" indicated in the record with "5" as the ID 1001 is selected. A record with "6" as the ID 1001 shows that the reference value 1901 and the countermeasure rule 1004 do not change.

<Flowchart of Operation Update Processing>

Figure 23:
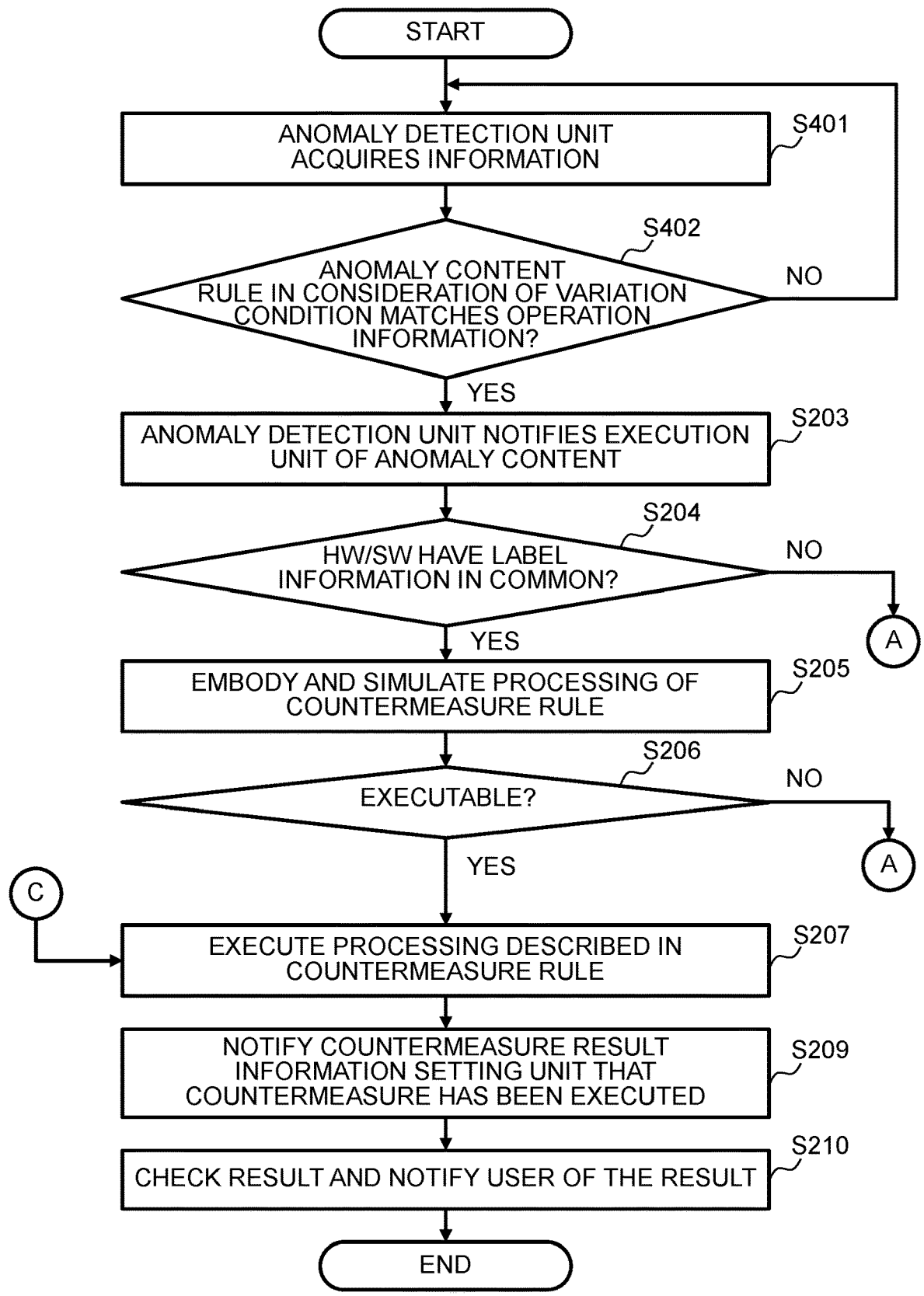
FIG. 23 is a flowchart illustrating operation update processing according to the third embodiment.

FIG. 23 is a flowchart illustrating operation update processing according to the third embodiment. This flowchart is processing corresponding to FIG. 12 in the first embodiment and only first two steps are different from those in the first embodiment.

In step S401, the anomaly detection unit 2212 acquires the configuration information, the operation information, and the countermeasure result information from the operation information table 2222 and the countermeasure result table 2223, respectively. In step S402, a value of the anomaly detection rule is decided based on the content of the configuration information and the operation information, and the reference value 1901 and the variable condition 1902 of the countermeasure result table 2223B. Then, the anomaly detection unit 2212 judges whether or not this decided value matches a value indicated in the configuration information and the operation information. If the anomaly detection unit 2212 determines that these values match each other, it proceeds to step S203; and if the anomaly detection unit 2212 determines that these values do not match each other, it returns to step S401. Since the processing in step S203 and subsequent steps is similar to that in the first embodiment, an explanation about it is omitted.

Incidentally, regarding the processing in step S222 and step S223 in FIG. 14 for adding a record(s) to the countermeasure result table 2223B, the anomaly detection rule 1003A, the reference value 1901, and the variable condition 1902 may be used in this embodiment instead of the anomaly detection rule 1003. Also, a specific value(s) used when executing step S222 and step S223 may be used as the anomaly detection rule 1003.

In this embodiment, the anomaly detection rule(s) which is used in the first embodiment is not the fixed content, but can be changed according to the operation circumstances. Consequently, even in a case of rules which the HW/SW have in common, not only the rules which are defined in advance are used, but also the rules can be operated flexibly depending on the users operations, for example, changes in the configuration and how the load is imposed. Furthermore, not only the rules which the HW/SW have in common are used, but also a rule(s) added during the operation can be changed after registration, so that the operation can be performed flexibly.

According to the aforementioned third embodiment, the following operational advantages can be obtained.

(9) The anomaly detection unit 2212 detects the divergence of the operation information on the basis of the operational status of the computer system 4a. Therefore, it becomes possible to operate the rules flexibly according to the users operations, for example, changes in the configuration and how the load is imposed.

(10) There is provided the input unit 2219 which accepts inputs regarding the anomaly detection rule and modifies the anomaly detection rule 1003A, the reference value 1901, and the variable condition 1902 on the basis of the inputs. Therefore, a rule(s) added during the operation can be changed after registration, so that it becomes possible to perform the operation flexibly.

Incidentally, the present invention is not limited to the embodiments described above, and includes various variations. For example, the embodiments described above provide a detailed explanation of the present invention in order to make it easier to understand the invention, and do not necessarily limit it to embodiments including all of the explained configurations. Furthermore, so long as there is no incompatibility, part of the configuration of one embodiment may be replaced with the configuration of another embodiment, and the configuration of one embodiment may have the configuration of another embodiment added to it. Furthermore, addition, deletion, replacement, integration, or distribution of a configuration may also apply with respect to a part of the configuration of each embodiment. In addition, the configurations and processing indicated in the embodiments can be distributed, integrated, or replaced as appropriate based on processing efficiency or implementation efficiency.

The aforementioned respective embodiments and variations may be combined with each other. The various embodiments and variations are explained above, but the present invention is not limited to the details of these embodiments and variations. Other aspects which can be thought of within the scope of the technical idea of the present invention are also included within the scope of the present invention.

REFERENCE SIGNS LIST

1: storage apparatus
1S: computer system
2: storage management server
3: operational information management system
223, 223B: countermeasure result table
1002: anomaly location
1003, 1003A: anomaly detection rule
1004: countermeasure rule
1005: label
1008: configuration
1009: effect
1211: data processing unit
1212: storage management unit
1901: reference value
1902: variable condition
2211: information collection unit
2212: anomaly detection unit
2213: execution unit
2214: countermeasure result information setting unit
2219: input unit
2221: configuration information table
2222: operation information table
2223, 2223B: countermeasure result table
2224: assumed cause correspondence relationship table
2225: proposed countermeasure correspondence relationship table
2226: storage operation log
2227: storage processing schedule
3211: operational information management unit
3221: operational information table
22245: assumed cause countermeasure

The invention claimed is:

1. A management apparatus for managing a computer system including a plurality of nodes, each of which includes a processor and a storage device,
the management apparatus storing a countermeasure result table including a plurality of combinations of an anomaly detection rule which is a reference for detecting an anomaly, a countermeasure rule which is a countermeasure against the anomaly, an effect indicating effectiveness of the anomaly detection rule and the countermeasure rule, and, in each of the combinations, a label indicating a relationship between a combination of the anomaly detection rule and the countermeasure rule, and the computer system, and
the management apparatus comprising:
an anomaly detection unit that detects an anomaly of the computer system based on operation information acquired from the computer system and the anomaly detection rule;
an execution unit that decides a countermeasure for the computer system, at which the anomaly has been detected by the anomaly detection unit, based on the detected anomaly, the countermeasure rule, and the effect indicating the effectiveness, and executes the decided countermeasure, and narrows down the countermeasure rule based on the label, carries out a simulation when the narrowed-down countermeasure rule is used and applied to the computer system, and decides and executes the countermeasure rule based on the simulation; and
a countermeasure result information setting unit that evaluates a result of the countermeasure executed by the execution unit and records the result as the effect indicating the effectiveness in the countermeasure result table.

2. The management apparatus according to claim 1, wherein the label includes information of the computer system to which the combination of the anomaly detection rule and the countermeasure rule is applied.

3. The management apparatus according to claim 2, wherein the computer system to which the combination of the anomaly detection rule and the countermeasure rule is applied includes configuration information of the computer system or user information of the computer system.

4. The management apparatus according to claim 3, wherein the configuration information of the computer system includes at least a disaster recovery configuration, a local copy configuration, a high availability configuration, a virtualization configuration, a data compression setting, a data deduplication setting, whether an encryption setting exists or not, and an I/O capping setting.

5. The management apparatus according to claim 1, wherein the effect indicating the effectiveness in the countermeasure result table includes, in addition to whether the effect is effective or not, at least one of processing time of countermeasure processing, a processing cost of the countermeasure processing, a side effect of the countermeasure processing, and an improvement degree.

6. The management apparatus according to claim 1, wherein the management apparatus stores an assumed cause correspondence relationship table which associates a resource for the computer system with an assumed anomaly cause, and a proposed countermeasure correspondence relationship table which indicates a combination of the anomaly cause and a countermeasure against the anomaly cause; and
wherein when the anomaly is detected, the management apparatus selects a resource relating to the detected anomaly, an assumed cause of the resource, and a proposed countermeasure corresponding to the anomaly cause by using the assumed cause correspondence relationship table and the proposed countermeasure correspondence relationship table, decides and executes a countermeasure from the selected proposed countermeasure, and adds a result of the execution, as a combination of the anomaly detection rule, the countermeasure rule, the label, and the effect indicating the effectiveness, to the countermeasure result table.

7. The management apparatus according to claim 6, wherein the anomaly is detected by comparing the operation information of the computer system at different times and detecting a divergence of the operation information.

8. The management apparatus according to claim 7, wherein the anomaly detection unit detects the divergence of the operation information based on an operational status of the computer system.

9. A management method executed by a management apparatus for managing a computer system including a plurality of nodes, each of which includes a processor and a storage device, the management apparatus including a storage unit that stores a countermeasure result table including a plurality of combinations of an anomaly detection rule which is a reference for detecting an anomaly, a countermeasure rule which is a countermeasure against the anomaly, an effect indicating a combined effectiveness of the anomaly detection rule and the countermeasure rule, and, in each of the combinations, a label indicating a relationship between a combination of the anomaly detection rule and the countermeasure rule, and the computer system,
the management method comprising:
detecting an anomaly of the computer system based on operation information acquired from the computer system and the anomaly detection rule;
deciding a countermeasure for the computer system, at which the anomaly has been detected, based on the detected anomaly, the countermeasure rule, and the effect indicating the effectiveness, and executing the decided countermeasure;
narrowing down the countermeasure rule based on the label;
carrying out a simulation when the narrowed-down countermeasure rule is used and applied to the computer system;
deciding and executing the countermeasure rule on the basis of based on the simulation; and
evaluating a result of the executed countermeasure and recording the result as the effect indicating the effectiveness in the countermeasure result table.

* * * * *